(12) United States Patent
Niwa et al.

(10) Patent No.: US 11,289,761 B2
(45) Date of Patent: Mar. 29, 2022

(54) BATTERY UNIT

(71) Applicant: DENSO CORPORATION, Kariya (JP)

(72) Inventors: Masato Niwa, Kariya (JP); Kohei Yamamoto, Kariya (JP); Hidehiro Kinoshita, Kariya (JP); Yoshimitsu Inoue, Kariya (JP)

(73) Assignee: DENSO CORPORATION, Kariya (JP)

( * ) Notice: Subject to any disclaimer, the term of this patent is extended or adjusted under 35 U.S.C. 154(b) by 451 days.

(21) Appl. No.: 16/342,159

(22) PCT Filed: Oct. 5, 2017

(86) PCT No.: PCT/JP2017/036262
§ 371 (c)(1),
(2) Date: Apr. 15, 2019

(87) PCT Pub. No.: WO2018/070334
PCT Pub. Date: Apr. 19, 2018

(65) Prior Publication Data
US 2019/0237723 A1    Aug. 1, 2019

(30) Foreign Application Priority Data
Oct. 14, 2016    (JP) .............................. JP2016-202701

(51) Int. Cl.
*H01M 2/10*      (2006.01)
*H01M 10/6554*   (2014.01)
*H01M 10/42*     (2006.01)
*H01M 10/44*     (2006.01)
*H01M 10/647*    (2014.01)
*H01M 50/20*     (2021.01)
*H01M 10/613*    (2014.01)

(52) U.S. Cl.
CPC ......... *H01M 50/20* (2021.01); *H01M 10/425* (2013.01); *H01M 10/441* (2013.01); *H01M 10/613* (2015.04); *H01M 10/647* (2015.04); *H01M 10/6554* (2015.04); *H01M 2220/20* (2013.01)

(58) Field of Classification Search
None
See application file for complete search history.

(56) References Cited

U.S. PATENT DOCUMENTS

2014/0356662 A1* 12/2014 Yang ...................... B60L 50/64
                                                          429/72

FOREIGN PATENT DOCUMENTS

| EP | 2 290 728 A1 | 3/2011 |
| JP | 2002-184374 A | 6/2002 |
| JP | 2014-013725 A | 1/2014 |

OTHER PUBLICATIONS

Oct. 31, 2017 International Search Report issued in International Patent Application No. PCT/JP2017/036262.

* cited by examiner

*Primary Examiner* — Christopher P Domone
(74) *Attorney, Agent, or Firm* — Oliff PLC

(57) ABSTRACT

A battery unit includes a battery module having a plurality of batteries that are lined next to each other, and a case that accommodates the battery module. An intermediate heat releasing member that is configured to release heat from a center position to the case is arranged in a center position, between the plurality of batteries in the battery unit.

17 Claims, 16 Drawing Sheets

FIG.13
(a) 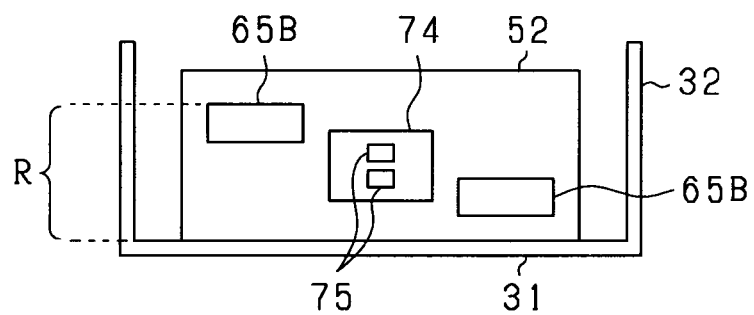
(b) 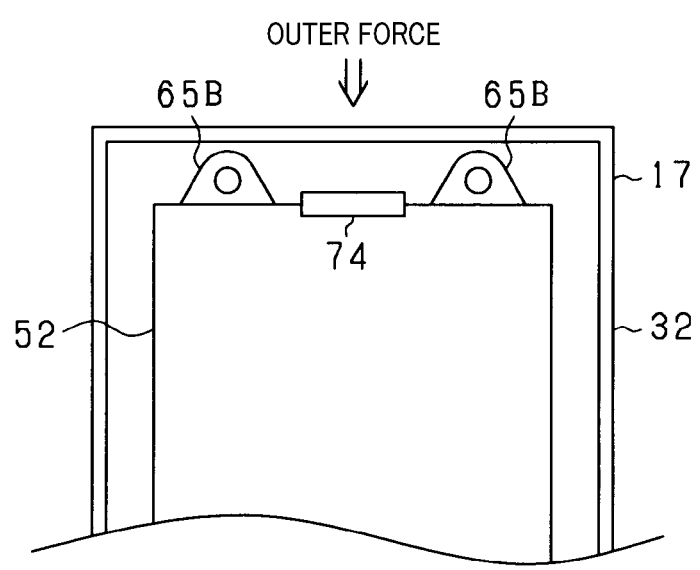
FIG.14
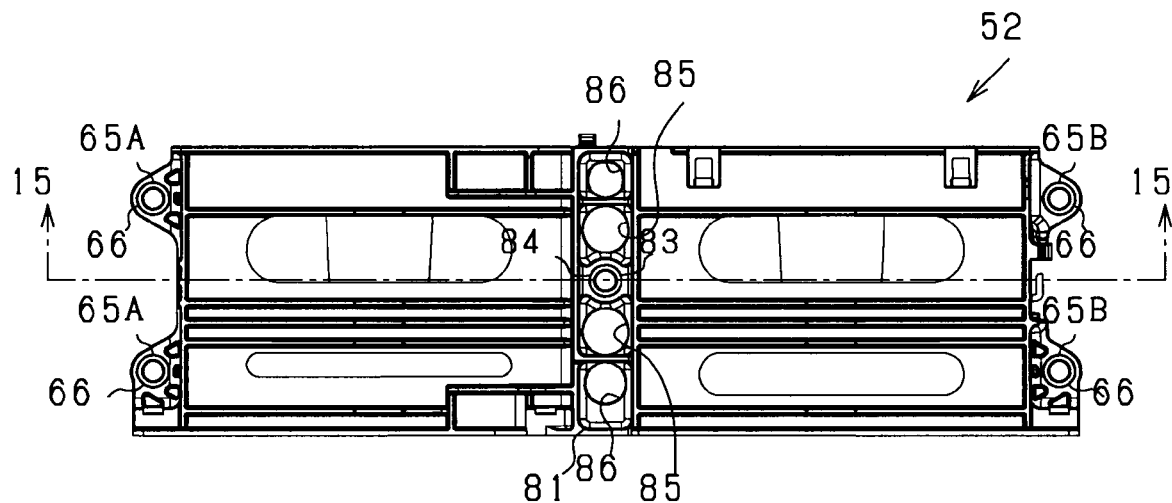

FIG.18
(a)
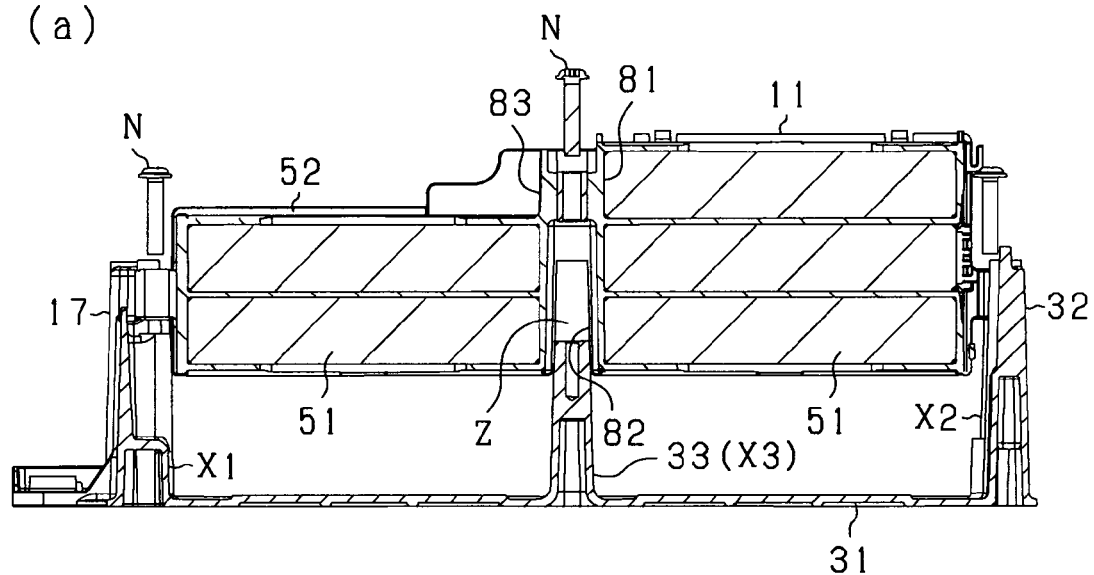
(b)
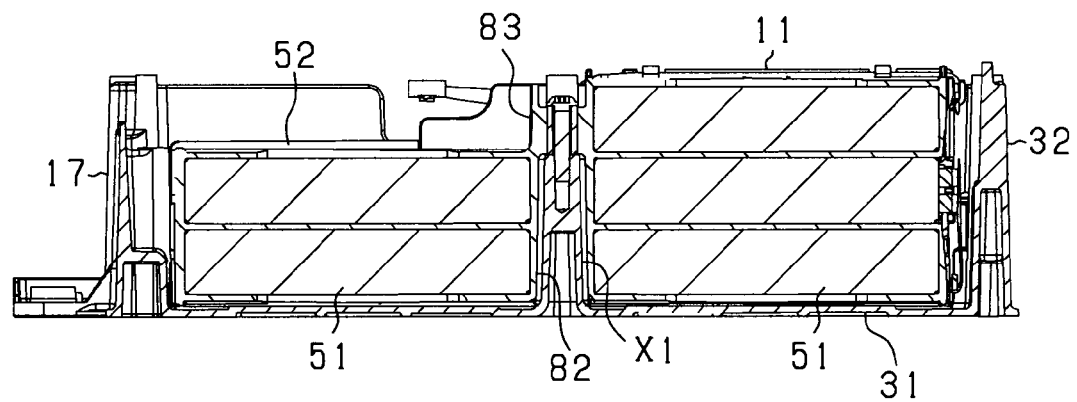

FIG.19
(a)
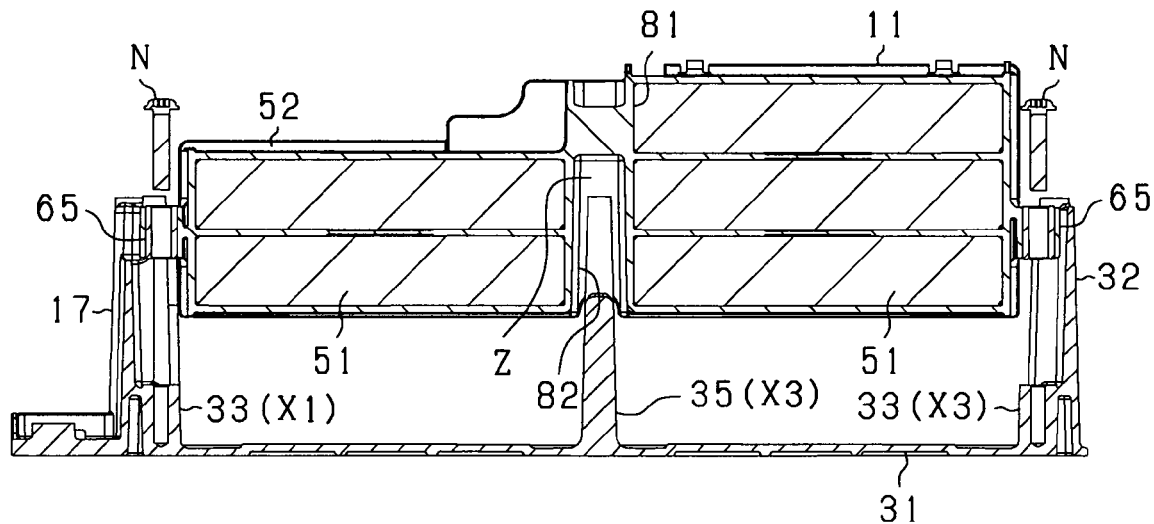
(b)
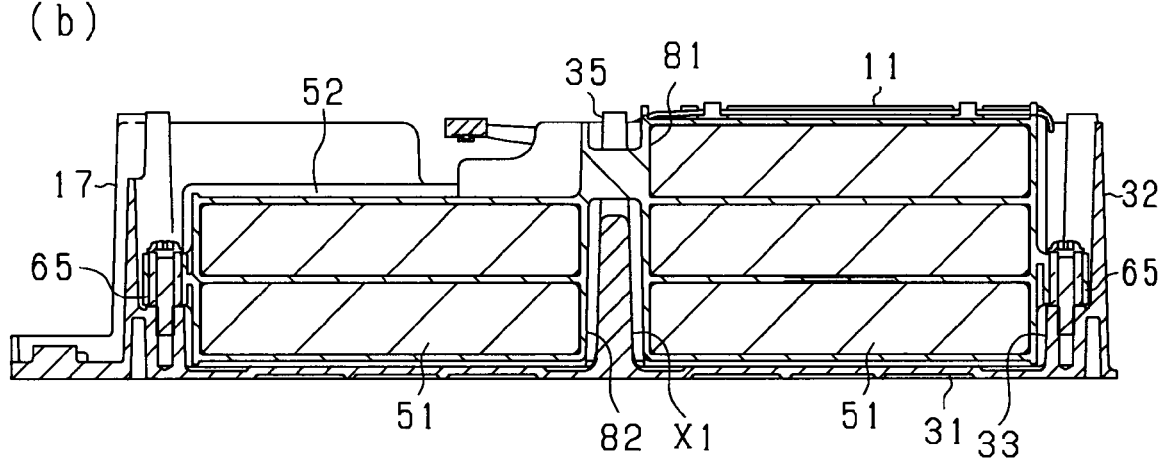

BATTERY UNIT

This application is a U.S. National Phase Application under 35 U.S.C 371 of international Application No. PCT/JP2017/036262 filed on Oct. 5 2017. This application is based on and claims the benefit of priority from Japanese Patent Application no. 2016-202701, filed on Oct. 14, 2016. The entire disclosures of all of the above applications are incorporated herein by reference.

The present disclosure relates to a battery unit that is used in a vehicle, for example.

TECHNICAL FIELD

A Conventional configuration of a battery unit is known in which a battery module and a control board, for example, are contained inside a case and packed as a one body (Japanese patent literature 1). In this configuration, the battery module is provided with a plurality of batteries that are housed as one part in battery case (battery housing member) and in this state, the battery module is fixed to the case by a fixing member, for example, a fastening member.

The battery unit disclosed in the JPL 1 is configured with a plurality of batteries, which are horizontally arranged in the case, and the battery module fixed to the case at both ends of the case.

CITATIONS

Patent Literature

Patent Literature 1: 2014-13725

In the conventional battery unit, a heat transmission pathway is formed on a fixed portion that is positioned at both ends of the battery case. The heat transmission pathway forms a pathway from the battery module to the case and releases heat from the batteries to a side of the case. However, when the batteries are arranged next to each other in a horizontal direction of the batteries, heat may accumulate between the batteries and thus form a high temperature state. It is therefore considered that current techniques can be further improved.

SUMMARY

In view of the above-mentioned issues, a main object of the present disclosure is to provide a battery unit that can release heat from batteries in a suitable manner.

A mode to resolve the above issues and a working effect thereof will now be described. Hereafter, symbols that correspond to a mode of the present disclosure are used for simplification. However the present disclosure is not limited to the specified configuration shown with the symbols, for example.

A first mode of the present disclosure is a battery unit that includes,

A battery module provided with a plurality of batteries positioned next to each other; and a case accommodating the battery module. The battery unit is also provided with an intermediate heat releasing portion, which is arranged in a center position between the plurality of batteries. The heat release portion allows release of heat from the center position to the case.

In a configuration in which a plurality of batteries are arranged to next to each other, a center position between two batteries is liable to accumulate heat. However, according to the configuration, since the intermediate heat-releasing member is provided at the center position between the batteries, a heat-releasing performance can be enhanced. As a result, the releasing of heat from batteries can be suitably performed.

A second mode of the disclosure is the case which includes a bottom portion and a surrounding wall. The battery module is positioned on the bottom portion, and the plurality of batteries are arranged next to each other in a horizontal direction of the batteries along the bottom portion of the case. In the center position, that is, a center position of a section in which the battery module is positioned, protruding portions are configures to extend upwardly, in a perpendicular direction to the bottom portion, whereby; the protruding portion configures the intermediate heat-releasing member.

According to the configuration, the intermediate heat-releasing member is formed to overlap with the section onto which the battery module is positioned in the case. The intermediate heat-releasing member is thus ideally configured in the center position between the batteries. In this case, heat that is received from the intermediate heat-releasing member is transmitted to the bottom portion of the case, and then this heat is diffused in a form of radiation from a surface direction of the bottom portion. As result, by enhancing a heat-releasing performance an appropriate configuration can also be obtained.

A third mode of the present disclosure is the battery module includes a battery-housing member, which houses the plurality of batteries as one unit, and an intermediate structure. The battery-housing member is provided with a plurality of housing portions. The plurality of housing portions are arranged along the bottom portion and are provided to accommodate the plurality of batteries. The intermediate structure is provided between the housing sections, and has a groove section which separates the housing portions from each other. The protruding portions are arranged to occupy the groove section.

According to this configuration, the intermediate structure is provided between the plurality of the housing sections (battery housing section), and the protruding portion (intermediate heat-releasing member) occupies the groove section. In this configuration, heat between the batteries can be received by the intermediate heat-releasing member while suppressing the effects caused by the heat between each of the batteries.

A fourth mode of the disclosure is a connection portion that is provided on the intermediate structure. The connection portion is fixes the battery-housing member to the case by connecting a front-end side of the protruding portion to the case. A heat transmission pathway from a side of the batteries to a side of the case is formed at the connection portion.

According to the configuration, since the connection portion that is provided on the intermediate structure is connected to the protruding portion on the side of the case, the battery housing member can be firmly fixed at the center position, even when a length dimension of the battery housing member is increased by arranging the plurality of batteries in the length-wise direction. As a result, the battery module can be stably retained inside the case.

Also, in addition to a connecting function, the connection portion has a function of directly transmitting heat from the side of the batteries to the side of the case, therefore, a suitable heat release performance can be obtained. It is noted that if a screw or a bolt, for example, is used to connect the protruding portion to the connection portion, since heat transmission is performed by the fastening member, the heat-releasing performance can be further enhanced via the connection portion.

In a fifth mode of the present disclosure, the battery unit is provided with a board onto which there are mounted electrical components that perform charging and discharging of the battery module. The board is disposed on a side that opposes the bottom portion, with the battery module intervened between the bottom portion and the board. The protruding portion includes a board fixing member and the board is fixed to a front end of the board fixing member.

The board is arranged on the side which is opposes the side of the bottom portion, with the battery module intervened therebetween. Since the configuration includes the board fixing member arranged on the protruding portion of the case, the board fixing member can provide an additional feature as a center heat-releasing member thereof. Furthermore, heat that is generated from the electrical components mounted on the board can be released to a side of the board via the protruding portion (the center heat-releasing member).

It is noted that by combining the configuration of the fourth mode in which the intermediate structure is provided with the connection portion that connects to the protruding portion (mode four), and a part (board fixing member) that fixes the board, a configuration in which heat can be released from the batteries can be obtained.

A sixth mode of the present disclosure is deformation suppression plate that is assembled to the side that opposes the side of the bottom portion, with the battery module intervened therebetween. The deformation suppression plate suppresses deformation of the battery module. The protruding portion includes a plate fixing member (34) to which the deformation suppression plate to is fixed. The deformation suppression is fixed to a tip end of the plate fixing member, and the deformation suppression plate is thus fixed to the plate-fixing member.

According to the configuration, the deformation suppression plate is disposed on the side opposing the side of the bottom portion of the case, with the battery module intervened between. Furthermore, since the configuration includes the plate-fixing member on the protruding portion of the case, an additional function as an intermediate heat-releasing member is provided by the plate-fixing member of the protruding portion.

The fourth mode, in which the intermediate structure includes the connection portion that is connected to the protruding portion fixing the battery housing member to the case, or the fifth mode, whereby the protruding portion is provided with the board fixing member can thus be combined, and the protruding portion that has, a part that connects the connection portion, a part (board fixing member) that fixes the board, or a part (plate fixing member) that fixes the deformation suppression plate is thus obtained. As a result, a further enhanced configuration with of releasing heat from the batteries may be obtained.

In a seventh mode of the disclosure, side heat-releasing members are formed on sides which are opposed to the intermediate heat-releasing member, in addition to the intermediate heat-releasing member, on a side of the battery module. The side heat-releasing members are disposed on the sides with the battery intervened therebetween.

According to the configuration, heat from the batteries is released via the intermediate heat-releasing member and the side heat-releasing members. As a result, the heat releasing performance can be further enhanced. Also, since heat is released on both sides of the batteries, unbalanced heat distribution of the batteries can be suppressed.

For example, in a case of raising a current level and thus increasing a battery size, since heat is released on both sides of the battery, a decrease in performance caused by heat can be suppressed.

In an eighth mode of the present disclosure, the intermediate heat releasing member and the side heat releasing members are fixing members that fix the battery module to the case. The side heat releasing members are positioned on both ends of the batteries, in the horizontal direction thereof.

According to the configuration, the battery module is provided with the plurality of batteries that are positioned next to each other, in the horizontal direction thereof, and fixed to the case. In this case, since a fixing point of the module to the case gathered in positions in the horizontal direction of the batteries, a fixing point that is perpendicular to the horizontal direction of the batteries can be omitted, and enhanced compactness may be obtained.

In a ninth mode of the disclosure, the batteries have a long rectangular-shaped surface that is a surface having a largest surface area, among outer surfaces, and a short-sided surface. The short-sided surface is opposed to another short-sided surface, in the horizontal direction of the battery, among a long sided-surface and the short-sided surface.

In a plan view, by arranging the rectangular-shaped batteries stacked vertically, with short-sided surfaces opposed to each other in the horizontal direction, a smaller amount of dead space is formed, compared to a configuration with the batteries arranged next to each other with long-sided surfaces opposed to each other, in the horizontal direction of the batteries. As a result, miniaturization of the battery unit can be obtained.

BRIEF DESCRIPTION OF DRAWINGS

The purpose of the disclosure described above and other purposes, in addition to features, and advantages thereof will become transparent with description described hereinafter with reference to drawings.

In the accompanying drawings;

FIG. 13 is a diagram showing a side-surface of the battery case (a) and a plan view of the battery case and the base (b);

FIG. 14 is a diagram showing a plan view of the battery case;

FIG. 18 is a diagram showing a vertical cross sectional view at a position in which a connection portion passes through an intermediate structure;

FIG. 19 is a diagram showing a vertical cross sectional view at a position where an insertion hole passes through the intermediate structure;

EMBODIMENTS OF THE DISCLOSURE

Hereafter, embodiments of the present disclosure are described based on the drawings. In a first embodiment, a power system for mounting in a vehicle is described. The power system controls charging and discharging of a battery member (power section) which supplies power to each electrical load in the vehicle in which the power system is mounted. The vehicle includes an engine that is an internal combustion engine, ECUs that are mounted in the vehicle to control the engine and other components, a power generation function that is driven by the engine or rotation of a wheel axle, an electrical rotating machine (motor) that provides power running function to rotate the engine and the wheel axle, a battery section that is charged by power that is generated by the electrical rotating machine and various electrical loads, for example.

The battery section of the vehicle is configured of a lead battery and a lithium-ion battery. In the first embodiment, a Li battery unit (hereafter simply referred to as a battery unit) that functions as the lithium-ion battery will be described.

Figure 1:
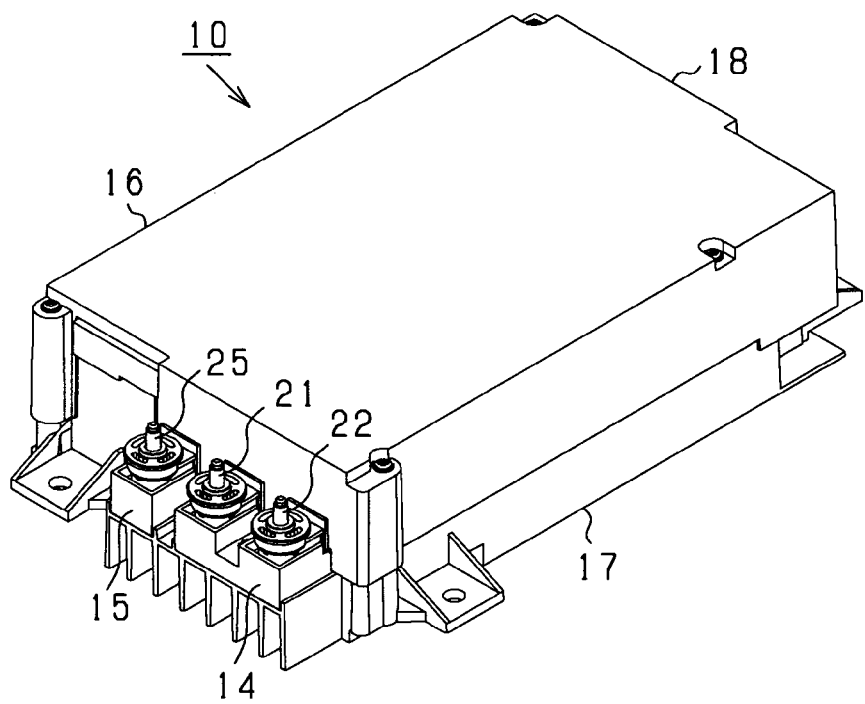
FIG. 1 is a diagram showing a perspective view of an overall configuration of a battery unit.

Firstly, an overall configuration of a battery unit 10 will be described with reference to FIG. 1 to FIG. 4. For convenience, a battery unit 10 that is disposed on a plan surface, as shown in FIG. 1, is used as a standard reference to define an upper and lower direction of the battery unit 10.

The battery unit 10 is provided with a battery module 11 having a plurality of can-shaped batteries, a control board 12 controlling charging and discharging, for example, of the battery module 11, a plate 13 that is provided along an top surface of the battery module 11, terminal modules 14 and 15 performing an input and an output of power, and a case 16 which accommodates the battery module 11. The case 16 has substantially rectangular shape and is provided with a base 17 that is fixed to a mounting position of the battery unit 11, and a cover 18 that is assembled to a top part of the base 17. The base 17 and the cover 18 are formed of a metal material, for example, aluminum, or a synthetic resin material.

Figure 3:
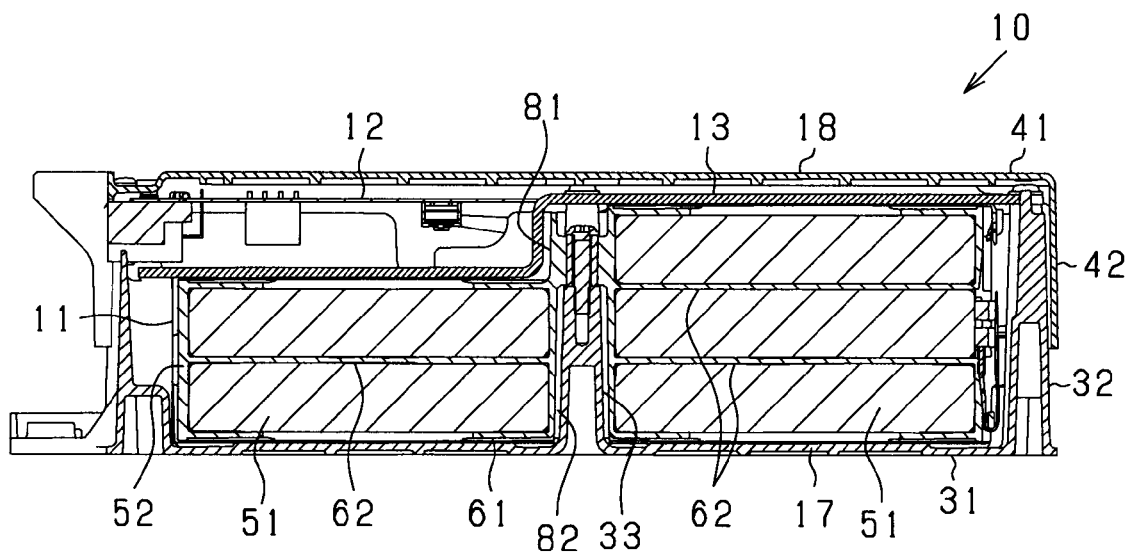
FIG. 3 is a diagram showing a vertical cross sectional view of the battery unit.
Figure 4:
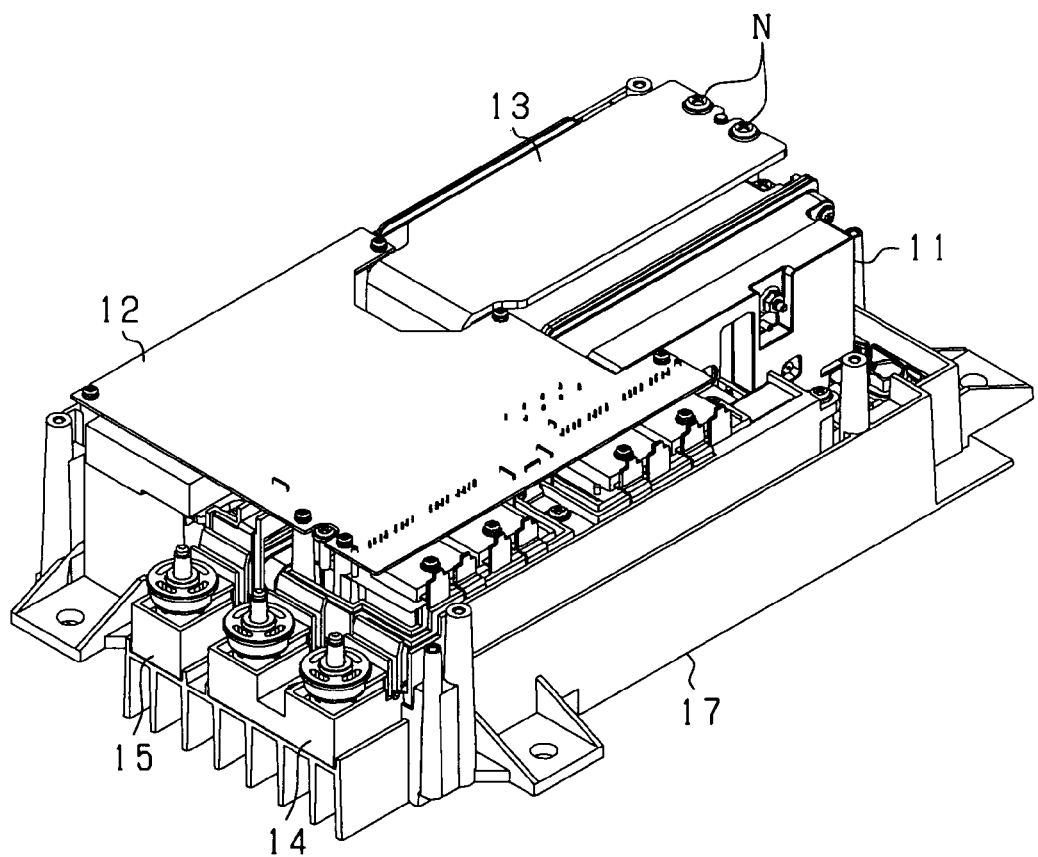
FIG. 4 is a diagram showing a perspective view of the battery unit without the cover.

The battery module 11, the control board 12 and the plate 13 are disposed on top of the battery module 11. That is, the plate 13 is disposed on the top of the battery module 11, and the control board 12 is disposed on top of the plate 13, so that the control board 12 is positioned both above and below the plate 13. Both the control board 12 and the plate 13 are fastened to the base 17 by a screw or a bolt, for example. As shown in FIG. 3 and FIG. 4, the battery module 11 has a level difference that is formed on a top surface thereof. The level difference is formed according to battery stacking layers, and the plate 13 that is formed to have a level difference is attached to the battery module 11 along the top surface. The plate 13 is a deformation suppression plate that suppresses deformation of the battery module 11 from occurring. The plate 13 is metal plate a high rigidity, for example. The top surface of the battery module 11 is provided with an upper side and a lower side, the upper side being disposed in a higher positioned than the lower-side, and the control board 12 is attached to the lower-side.

An upper part of the control board 12 and the plate 13 are provided at substantially the same position when viewed in a vertical direction thereof. A cover 18 is attached to the base 17 and thus the battery module 11 and the control board 12, for example, are accommodated inside the case 16.

Figure 2:
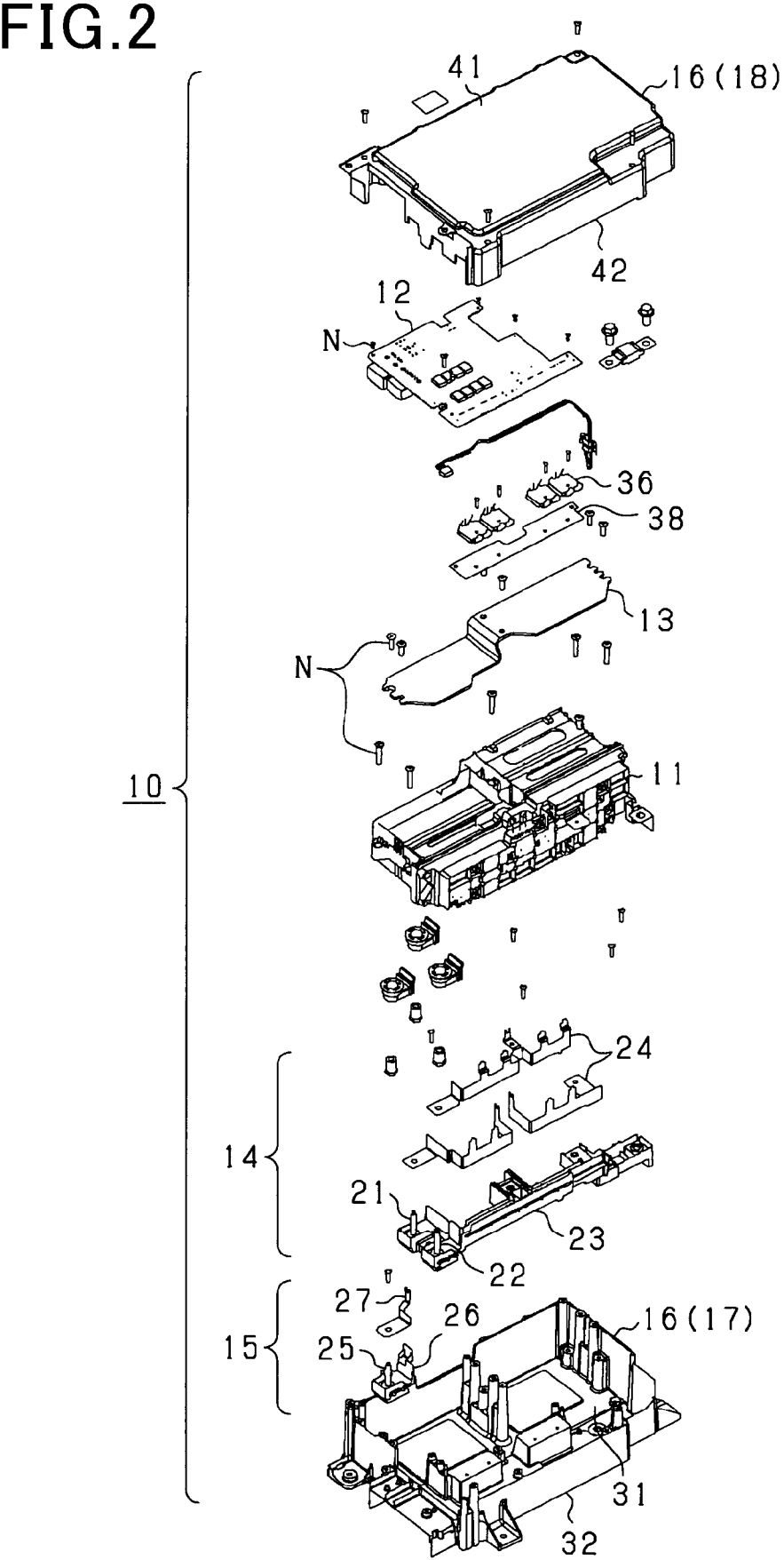
FIG. 2 is a diagram showing a perspective exploded view of the main configuration of the battery unit.

The terminal modules 14 and 15 include output terminals, each of which connect to the electrical loads of the lead battery and the electrical rotating machine. As shown in FIG. 2, the terminal module 14 includes an output terminal 21 that is connected to the lead battery, for example, and an output terminal 22 that is connected to the electrical rotating machine. These output terminals 21 and 22 are formed as a terminal stage 23 that is one part, and a bus bar 24 that forms a power pathway is connected to the terminals 21 and 22. A terminal module 15 has an output terminal 25 that is connected to an electrical load. The output terminal 25 is provided on the terminal stage 26 and is also connected to the bus bar 27. The terminal modules 14 and 15 are fixed to the base 17.

Figure 5:
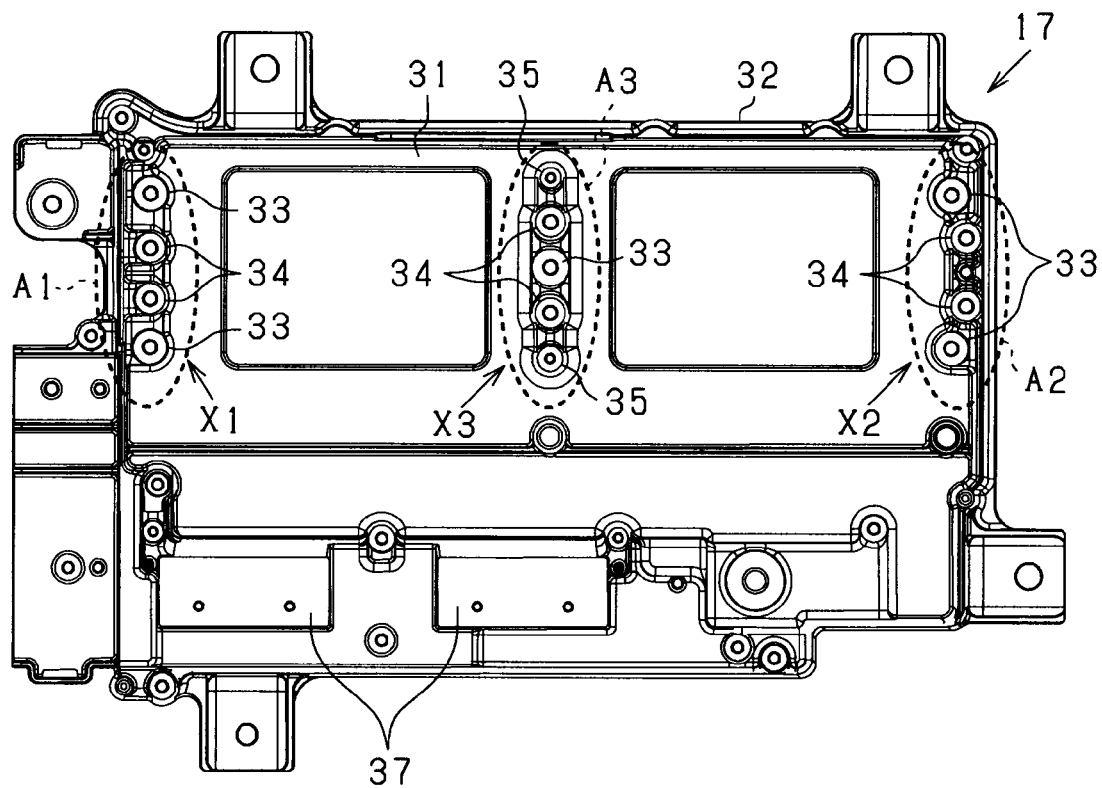
FIG. 5 is a diagram showing a plan view of a base.

Next, features of the battery unit 10 according to the first embodiment will now be described. Firstly, the base 17 of the case 16 will be described with reference to FIGS. 5 and 6.

The base 17 has a bottom plate 31 and a surrounding wall portion 32 that is provided to stand upwardly from the bottom plate. The bottom plate 31 is substantially square shape and the surrounding wall portion 32 is arranged to surround a peripheral edge or a close vicinity of a peripheral edge of the bottom plate 31. The battery module 11 is assembled onto the bottom plate 31 and opposed thereto. The battery module 11 is thus assembled onto the bottom plate 31 with the surrounding wall portion 32 arranged to surround the battery module 11. The battery module 11 is provided with batteries 51 which are lined along the bottom plate 31, and the base 17 (case 16) has a length-wise direction that facilitates the arranged position of the batteries 51 and a width-wise direction that is perpendicular to the length-wise direction. A further detailed configuration of the battery module 11 is described hereinafter.

The base 17 is provided with the battery module 11, the control board 12, the plate 13 and a plurality of fixing members 33 to 35 that fix each of these components. The fixing members 33 to 35 are round column shapes which project from either the bottom plate 31 or the surrounding wall section 32. The battery module 11, the control board 12, and the plate 13 are each provided with a base so that each member is fixed at a predetermined height.

A module-fixing member 33 fixes the battery module 11. The module-fixing members 33 are mounted in three locations, that is, at both ends of the bottom plate 31 (in the first embodiment the length-wise direction) along a side thereof, and a center position between the both ends. More specifically, the module-fixing members 33 are mounted at two locations on each end of the bottom plate 31 and also mounted at one location in the center position. In the same way a plate-fixing member 34 that fixes the plate 13 is mounted at three locations, that is, at both ends along the one side of the bottom plate 31 and the center position between the both ends. The board-fixing members 35 that fix the control board 12 are mounted at two locations, that is, on one end of the bottom plate and in the center position. It is noted that the number of fixing members 33 to 35 which are provided in the locations is arbitrary.

The fixing members 33 to 35 are each provided with a top surface that is formed as a flat surface. The flat surface is formed to extend in the same direction as a bottom surface of the bottom plate 31 to form the flat surface. Additionally, a thread hole is formed on each of the fixing members 33 to 35. A cover-fixing member of the respective battery module 11, control board 12 and plate 13 is in a close contact state with the top end of each fixing member, and in this contact state, each member is fastened with the fastener portions N and thus fixed.

As another fastening method, the fixing members 33 to 35 may also be provided with an anchor bolt that extends upwardly in a vertical direction from a top surface. In this case, the battery module 11, the control board 12 and the plate 13 may be fastened by the anchor bolt and fixed to the fixing members 33 to 35.

Figure 6:
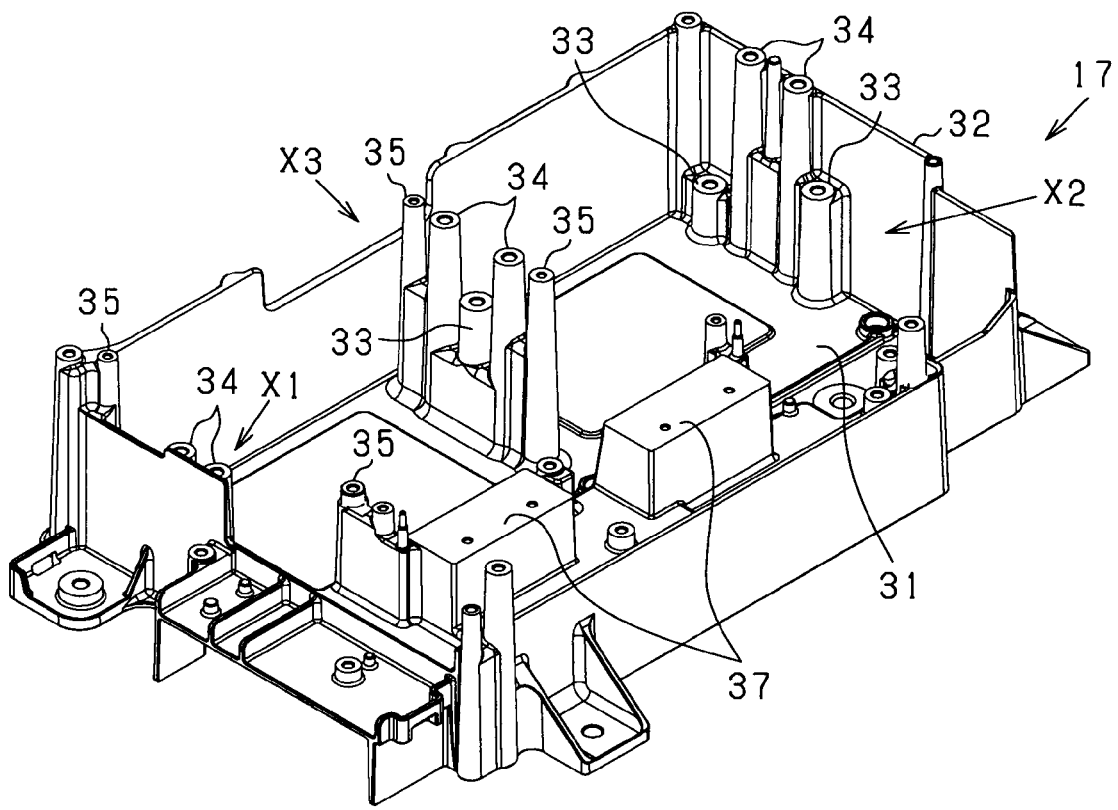
FIG. 6 is diagram showing a perspective of the base.

As shown in FIG. 6, the fixing members 33 to 35 are disposed in three locations in the lengthwise direction of the base 17. That is, the fixing members 33 to 35 are positioned in both end regions A1 and A2, in the lengthwise direction of the base 17, and also disposed in a middle region A3 that is between the end regions A1 and A2. The regions A1 to A3 are each provided with an associated fixing member, that is associated to each region, and at least a part of the fixing member in each of the regions A1 to A3 is continuously connected to another fixing member that associated with another region. The fixing members are thus connected to each other.

A module fixing member 33, plate fixing members 34 and the board fixing members 35 are provided at one end region, that is, A1 and the middle region A3, and module fixing members 33 and plate fixing members 34 are provided on another end region that is A2. Hereafter, the fixing members 33 to 35 that are associated with the end region A1 will be collectively referred to as fixing part X1, the fixing members 33 and 34 that are associated with the end region A2 are collectively referred to as fixing part X2, and the fixing members 33 to 35 that are associated with the middle region A3 are collectively referred to as fixing part X3.

The fixing members 33 to 35 of the fixed part X1 are provided to protrude upwardly from the bottom plate 31 of the base 17 and are unified as one part with the surrounding wall 32. In addition, the fixing members 33 and 34 of the fixing part X2 are also provided to protrude upwardly from the bottom plate 31 of the base 17 and are unified as one part with the surrounding wall 32.

It is noted that the battery module 11 includes a two level battery section and a three level battery section. The end region A1 is disposed on a side of the two level battery section and the end region A2 is disposed on a side of the three level battery section.

The fixing members 33 to 35 each have a predetermined height from the bottom plate 31, that is, a position of the top end of the fixing members 33 to 35 are each disposed at a predetermined position, in a vertical direction thereof, relative to the bottom plate. In this respect, the module-fixing members 33 are shorter in height than a top end of the surrounding wall 32. According to this configuration, a fixing point that is provided to fix the battery module 11 is positioned lower than the surrounding wall 32. A number of plate fixing members 34 are substantially the same height as the top end of the surrounding wall 32 in the vertical direction thereof, and remaining plate fixing members 34 are shorter than the number of plate fixing members 34, in order to have the same height as a level of the plate 13.

As a result, a number of fixing points that are provided to fix the plate 13 are arranged in the same position at the top end of the surrounding wall 32, and the remaining fixing points are disposed in positions that are lower than the top end of the surrounding wall 32. The board fixing members 35 have an approximately same height as the top end of the surrounding wall 32. Fixing points that fix the control board 12 are therefore positioned in the same position as the surrounding wall 32.

The module fixing members 33 will now be described. Two of the module fixing members 33 in the end region A1, both have the same height. In contrast, two of the module fixing members 33 in the end region A2, have different heights.

On the base 17, an element base 37 is provided to attach a semiconductor power element 36 (refer to FIG. 2) for a power control. The element base 37 has a plan top surface, and the power element 36 is mounted on the top surface (refer to FIG. 2) via an insulation sheet 38. The element base 37 is positioned next to the battery module 11. The element base 37 is a heat-releasing portion that externally releases heat which is generated at the power element 36 and has a heat-releasing rib that is provided on a lower part (reverse side) thereof. In this case, heat that generated at the power element 36 is transmitted to the element base 37 and then externally released from the unit.

As shown in FIG. 3, the cover 18 has a top board portion 41 and a cover wall portion 42 which extends from the top wall portion 41. An attachment of the cover 18 to the base 17 is performed by arranging the surrounding wall 32 of the base 17 on an inner-side of the case, and arranging the cover wall portion 42 of the of the cover 18 on an outside of the case, whereby the cover wall portion 42 is provided to overlap with the surrounding wall 32.

Next the battery module 11 will be described.

Figure 7:
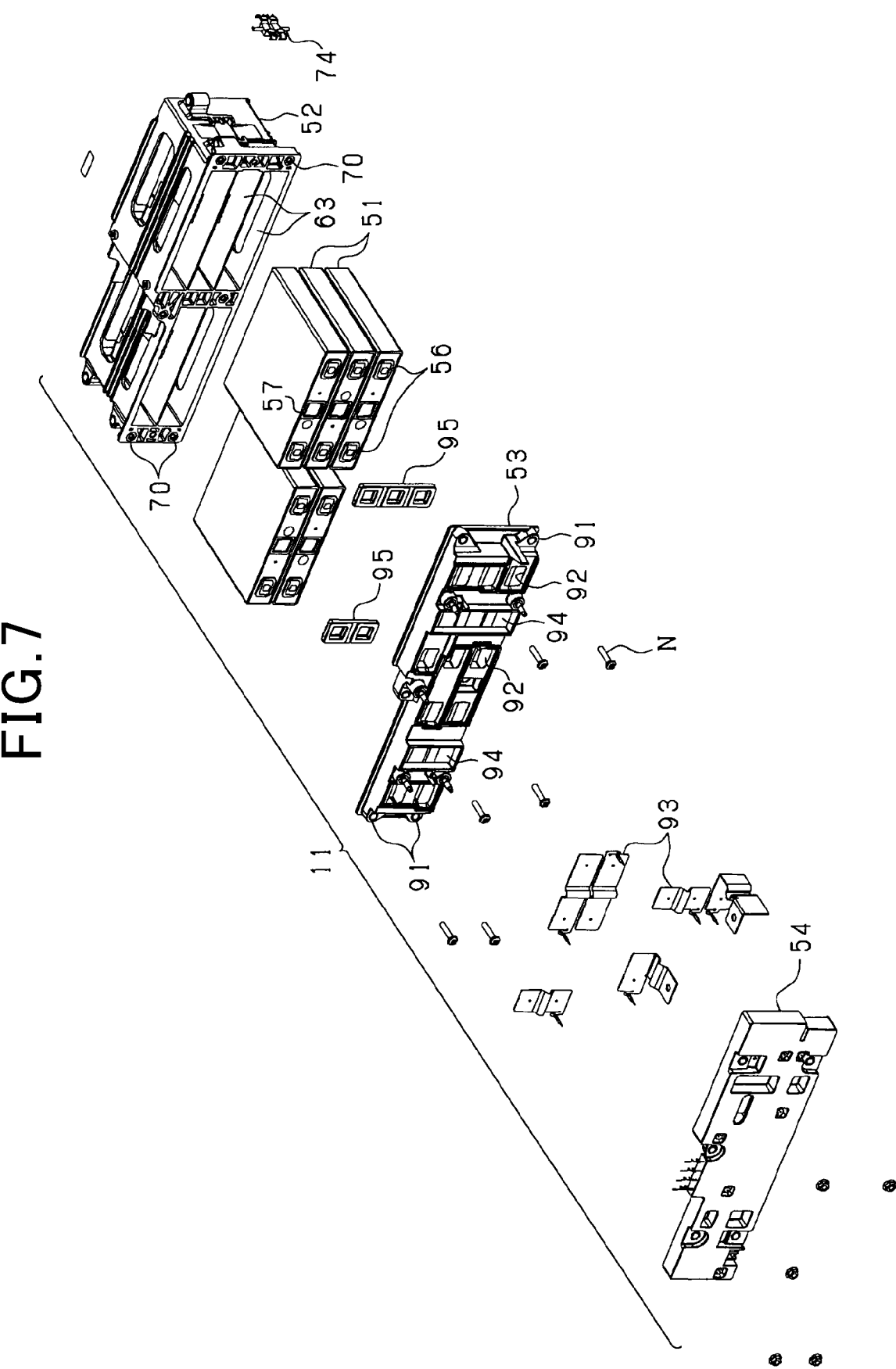
FIG. 7 is a diagram showing a perspective view of an exploded battery module.
Figure 8:
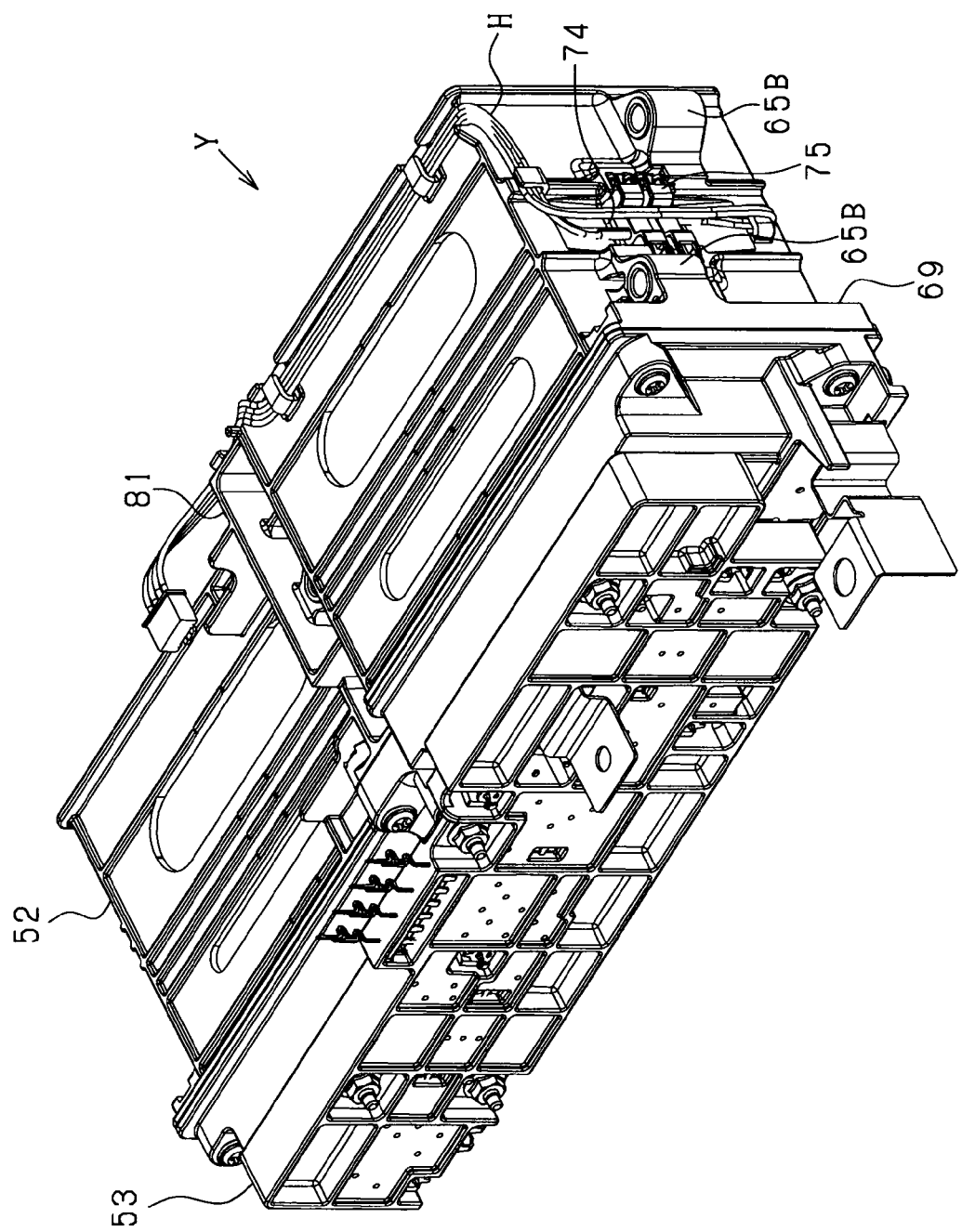
FIG. 8 is a diagram showing a perspective view of a battery main body.

As shown in FIG. 7, the battery module 11 is largely grouped into the plurality of batteries 51 (in the present embodiment 5 batteries), the battery case 52 that accommodates the plurality of batteries, an insulation cover 53 that is attached to the battery case 52, and an exhaust duct that is provided to overlap with the insulation cover 53 on an opposed side to the insulation cover 53. A battery main body Y that is shown in FIG. 8 is configured of the plurality of batteries 51, the battery case 52 that accommodates stacked batteries 51, and the insulation cover 53.

The five batteries 51 are lithium batteries that have a slim-type square shaped body. As shown in FIG. 7, the batteries 51 include a positive and a negative terminal 56 provided on one surface. An exhaust valve 57 is provided between the positive terminal 56 and the negative terminals 56. The exhaust valve 57 is a safety valve that is fractured and opened if an internal pressure of the batteries 51 is an abnormal pressure. For example, an outer case of the batteries 51 has an opened hole on an end surface that is covered with a thin metal layer. When the internal pressure of the battery 51 becomes an abnormal pressure, the metal layer on the exhaust valve is broken, and gas, for example, is externally released from the inside of the battery. As a result, a cell internal pressure is decreased and a situation of the battery itself braking is suppressed.

Figure 9:
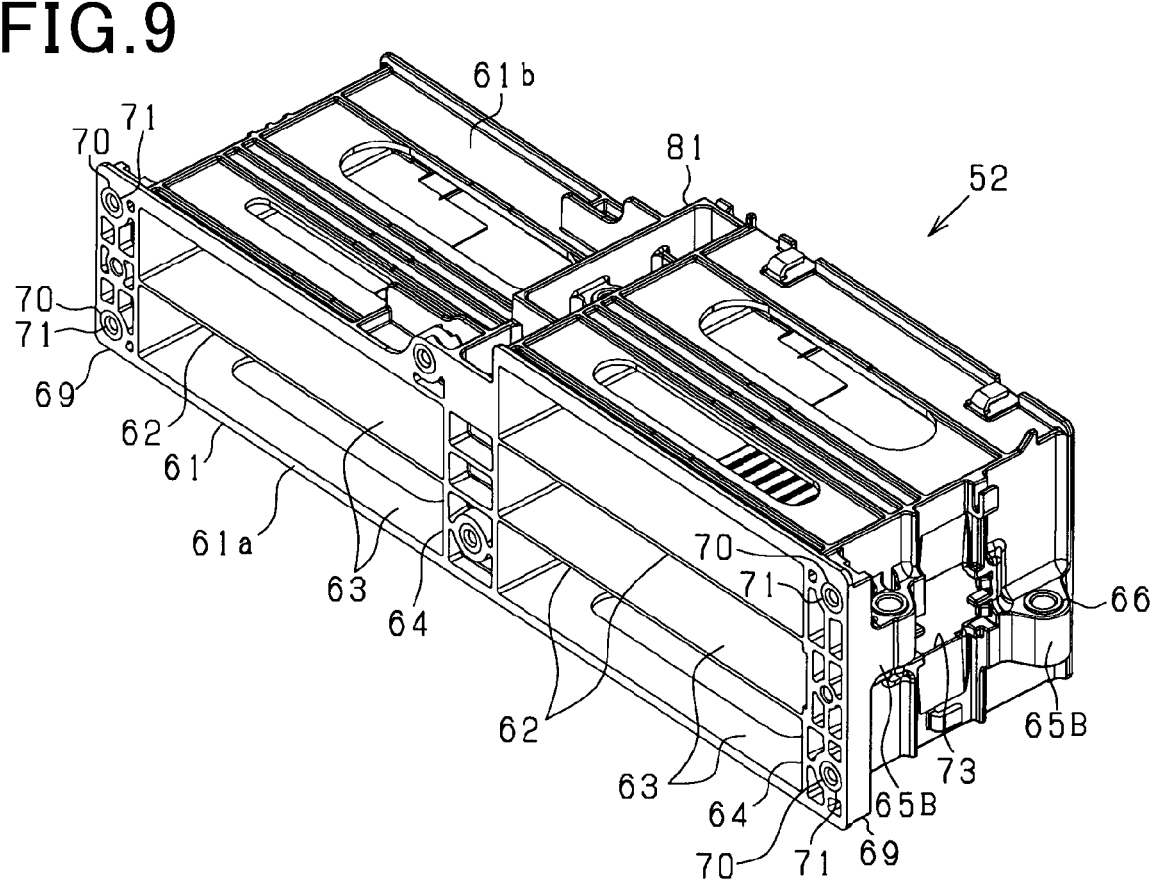
FIG. 9 is a diagram showing perspective view of a battery case.
Figure 10:
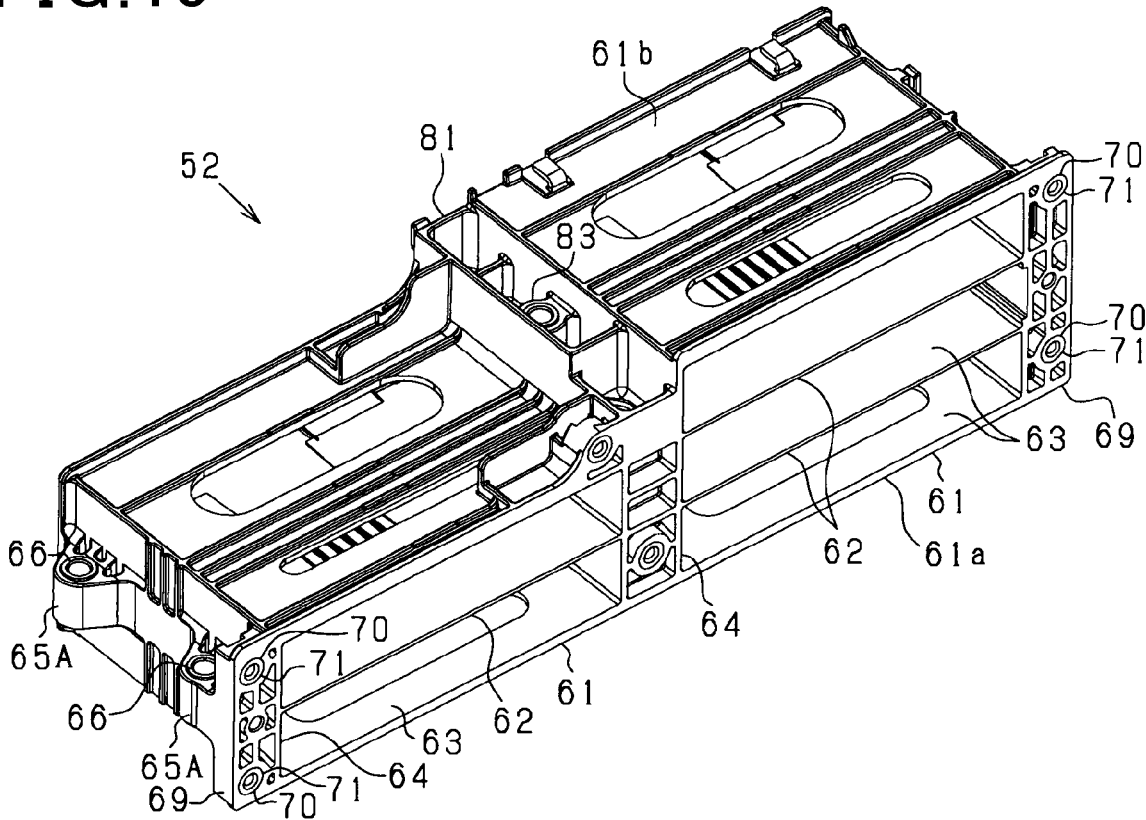
FIG. 10 is a diagram showing a perspective view of the battery case.

The battery case 52 is configured of the five batteries 51 accommodated on an inside thereof and a battery filling material, for example, a synthetic resin material that has insulation properties. FIG. 9 and FIG. 10 respectively show a perspective view of the battery case 52 when viewed from different directions.

As shown in FIG. 9 and FIG. 10, the battery case 52 has an outside portion 61 surrounding a periphery thereof, and partition portions 62 that are provided between the batteries 51 that are stacked vertically. The partition portion 62 is a separating portion. A housing portion 63 for each battery is thus formed for the five batteries 51 by the outside portion 61 and partition portion 62. The housing portion 63 has one side provided as an opening 64 on a side of the case. The batteries 51 are inserted into the housing portion via the opening 64. In the present embodiment, the five batteries 51 are divided into a two level-stacked battery group and a three level-stacked battery group and two stacks are arranged in a horizontal direction, that is arranged next to each other on the board 31 of the base 17. The five batteries 63 are thus divided into a two level-stacked section and a three level-stacked battery which are disposed next to each other in the horizontal direction.

The outside portion 61 includes a lower board portion 61a that is opposed to the bottom plate 31 of the base 17 on a bottom surface of the battery module 11 and a top board portion 61b that is a top surface of the battery module 11.

In the first embodiment, the five batteries 51 are divided into the two level stacked battery and the three level stacked battery, with the top surface (top board portion 61b) on the outside portion 61 provided with a level that has a thickness of one battery.

The batteries 51 have a thickness dimension, in a stacking direction thereof which is that is smaller than a width dimension of surface that cover a maximum surface area of a battery outer surface. Inside the case 52, the batteries 51 are stacked next to each other with one surface (in the figure a lower side surface) among a pair of the maximum surface areas, arranged to face towards the side of the bottom plate 31, and another surface (upper side in the figure) that is opposed the bottom plate 31 and stacked next to another battery surface. That is, in the first embodiment, the batteries 51 are laid down in the horizontal direction thereof, and in this state aligned next to each other. In a plan diagram, the batteries 51 have a length-wise direction that is the long side of the battery which are lined next to each other in the direction thereof. Specifically, among the outer surfaces of the battery, as mentioned hereinabove, the surface that has the maximum surface area is a rectangular shape, and the short sided surfaces of the battery which face each other.

The battery case 52 includes projected portions 65 (65A and 65B) which are configured on both ends in the length-wise direction, which are provided to project from an outside surface.

The projected portions 65 are fastener portions to which the fastener portions N are fastened. Specifically, projected portions 65 are module-fastening members that fix the battery module 11 to the base 17. Two projected portions 65 which are provided on each end of the battery case 52, in the length-wise direction, and the module fixing member 33 are fastened to the base 17 by fastening the fastener portions N. It is noted that a back side of the battery case 52 (on an opposed side to the openings 64) is not provided with a fastener portion. The projected portions 65 are configured in sections where the terminal 56 of the battery 51 is not provided, on an outer surface of the battery case 52. The projected portions 65 include a through-hole that is pierced therethrough in a vertical direction. A cylindrical metallic collar 66 is incorporated in the through hole as a strength support member.

Among the projected portions 65 that are provided on the both ends of the length-wise direction, the projected portions 65A that are provided on a side of the two level-stacked battery are mounted at the same height, that is level, on battery case 52 (refer to FIG. 10). However the projected portions 65A that are provided on a side of the three level-stacked battery are mounted at different levels (refer to FIG. 9). With reference to a configuration of the base 17 (refer to FIG. 5 and FIG. 6), the protruding portions 65A that are provided on the two-stacked level battery are fixed to the module fixing member 33 that is positioned in the end region A1 of the base 17, and the protruding portions 65B are fixed to the module fixing member 33 that is positioned in the end region A2 of the base 17.

Next, positions of the protruding portions 65 will be described in further detail. As described hereinabove, the battery case 52 has partition portion 62 that separate each housing portion 63 in the battery stacking direction. The protruding portions 65 are formed in positions that are extensions of the partition portions 62, on the outer surface of the case. In this case, on the two level-stacked battery-side, two projecting portions 65A are formed in positions that are the extensions of the partition portion 62, between the housing portions 63 provided on an a respective upper and lower level.

Figure 11:
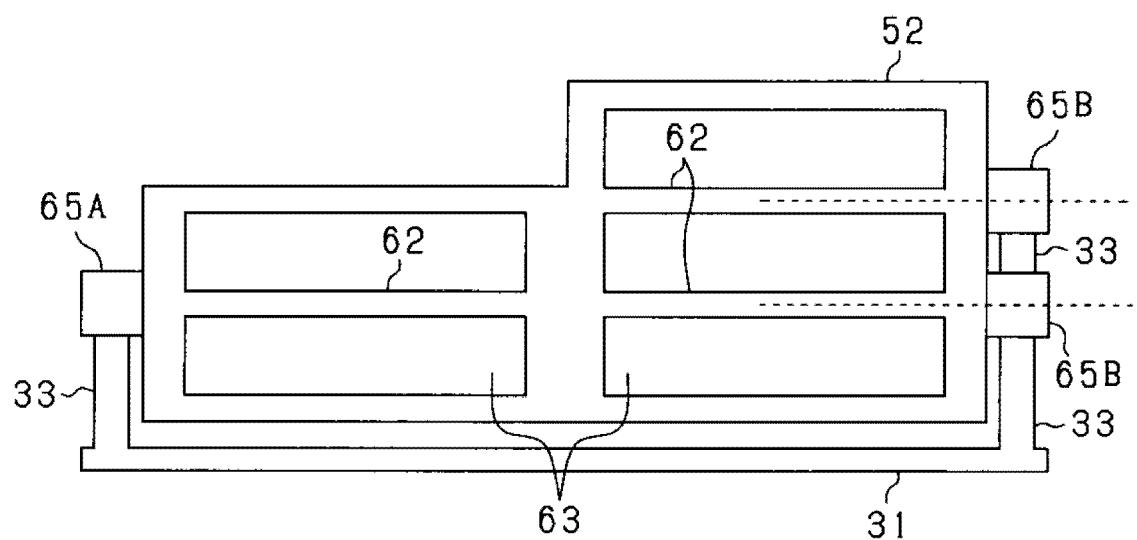
FIG. 11 is a diagram showing an overview of the base and a battery case.

In contrast, on the three level-stacked battery-side, two protruding portions 65B are formed on the extensions of two separate partition portions 62 that are provided between housing portions 63 on three levels. As a consequence the protruding portions 65B are dispersed on two separate partition portions 62. The protruding portions 65B are each provided on the extensions on both of the partition portions 62, with a battery 51 on a middle level intervened therebetween. It is noted that a configuration of the protruding portions 65A and 65B that are fixed on the module fixing member 33 is shown in FIG. 11.

The protruding portion 65 is provided to extend to the outer surface of the battery case 52 and is fastened by the fastener portion N, for example, a screw or a bolt. The protruding portion 65 therefore has a high strength compared to other parts. The protruding portions 65 have a collars 66 that are incorporated into the through-hole, and thus the strength thereof is further enhanced. Distortion of a partition portion 62, for example, contraction or expansion may occur due to high temperatures in the battery case 52 as a result of heat from the batteries, however, since a protruding portion 65 with enhanced strength is positioned on the extension of the partition portion 62, the distortion of the partition portion 62 is suppressed.

Flanges 69 are formed on a periphery of the opening portions 64 to outside of side of the battery case 52 in the length-wise direction. Each flange 69 is provided with fastener portions 70, provided in two locations on respective upper and lower part thereof. Each fastener portion 70 is provided to attach an insulation cover 53 by fastening the fastener portion N. The fastener portion 70 is a cover fastening member that fixes the insulation cover 53 to the battery case 52, and is provided with a through-hole, which is formed in an attaching direction of the cover. The through-hole includes a cylindrical metallic cover 71 that is incorporated as a strength support member in the through-hole. A male screw is preferably formed in the collar 71.

As shown in FIG. 8 and FIG. 9, the battery case 52 has an open section 73 that is formed on one end of the length-wise direction thereof. A temperature sensor 74, which detects a temperature of the batteries 51 is mounted on the open section 73. The open section 73 is configured on the side of the three level-stacked battery, among the respective side of the two level-stacked battery and the three level stacked battery. Specifically, the open section is provided in a position that corresponds to a center battery 51 provided on the middle level, among the batteries 51 stacked in three levels. The open section 73 is formed in a close vicinity of the protruding portions 65B, and in the first embodiment, specifically provided in a position between the two protruding portions 65B. Therefore the sensor 74 is fixed to the position at the further inside of the battery case 52 from the position at the front end of the protruding portion 65B, in relation to the protruding portions 65B that protrude towards the outside surface from the case 52.

Figure 12:
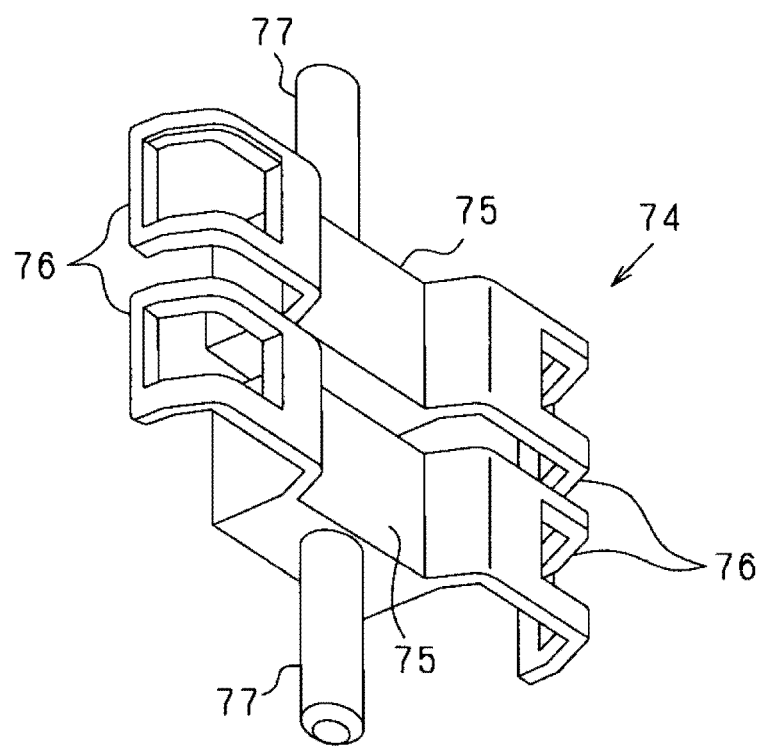
FIG. 12 is a diagram showing a perspective view a temperature sensor.

A configuration of the sensor 74 will next be described with reference to FIG. 12. The temperature sensor 74 is provided with two element portions 75 (thermistor), and an interlock portion 76 is provided on both ends of each element portion 75. The temperature sensor 74 is attached to the battery case 52 by interlocking the interlocking portion 76 to a peripheral part of the open section 73. The interlocking portion 76 has elastic force and the element portions 75 are held at a side of the batteries 51 by the elastic force. Each element portions 75 is equipped with a terminal portion 77 that is attached thereto, and harness H (refer to FIG. 8) is connected to the terminal portion 77.

When the temperature sensor 74 is attached to the battery case 52, the two element portions 75 are provided in the stacking direction of the batteries 51 (the stacking direction is also the battery thickness direction) relative to the same battery 51.

FIG. 13 is diagram of a schematic view that shows an attachment position of the temperature sensor 74 on the battery case 52. FIG. 13 (*a*) shows a side view of the battery case 52 and FIG. 13 (*b*) shows a plan view of the battery case 52 and the battery case 52 and the base 17.

With further reference to FIG. 13 (*a*) a position of the temperature sensor 74 on the battery case 52 is lower than a protruding portion 65B on an upper side end (specifically, positioned nearer to the bottom plate 31 than an end which opposes the bottom plate 31). In this case, the temperature sensor 74 is disposed in a region R, which is from one protruding portion 65B to the bottom plate 31, in a vertical direction of the battery case 53. However, the position of the temperature sensor on the battery base 52 may also be higher than the protruding portion 65B on the upper side thereof, in the height direction, as long as the temperature sensor 74 is positioned between the two protruding positions 65B in horizontal direction (a surface direction of the lower board 31 of the base 17).

FIG. 13(*b*) shows the battery case 52 (the battery module 11) mounted onto the base 17. In this state, the side surface of the battery case 52 is opposed to the surrounding wall 32 of the base 17, and the protruding portion 65B is positioned on an inside of the surrounding wall 32. In this case, as described earlier, the protruding portion 65B is a portion that has high strength. Therefore, if the protruding portion 65B is positioned on the inside of the surrounding wall 32, if the surrounding wall 32 is pressed against by an external force and deformation occurring or about to occur, deformation of the surrounding wall 32 is suppressed by the protruding portion 65B. As a result, damage to the temperature sensor 74 occurring by an external force, for example, is suppressed. As shown in 13(*b*), a projecting dimension of the temperature sensor 74 to the outside of the surrounding wall 32 is smaller than a projecting dimension of the protruding portion 65B.

In the plan view of the battery module 11, the battery case 52 has a plurality of side portions that cross with each other. On one of the side portions, a plurality of protruding portions 65B are provided in the horizontal direction of the surrounding wall 32, and the temperature sensor 74 is mounted between the plurality of protruding portions 65B.

As shown in FIG. 7, the insulation cover 53 is attached to the side of the opening 64 of the battery case 52 with batteries 51 accommodated in the battery case 52. The insulation cover 53 is provided with a plurality of fastener portions 91, each of which is disposed in a position corresponding to the fastener portion 70 provided on the battery case 52. The assembly of the battery case 52 to the insulation cover 53 is performed by tightening the fastener portions N at the fastener portions 70 and 91.

A plurality of opening portions 92 (in the first embodiment, 10 opening portions) into which the elements 56 of the batteries 51 are inserted through are formed on the insulation cover 53. A plurality of bus bars 93 are each attached to the insulation cover 53 in order to cover the holes 92. The batteries 51 are thus connected to each other in a straight line by the bus bars 93. In the first embodiment five opening portions 94 are provided in positions to correspond to the exhaust valve 57 of each battery 51 on the insulation cover 53. A packing 95 is packed between the batteries 61 and the insulation cover 53, and in this state, the opening portion 94 of the insulation cover 53 and an opening of the packing 95 are connected to each other.

Figure 15:
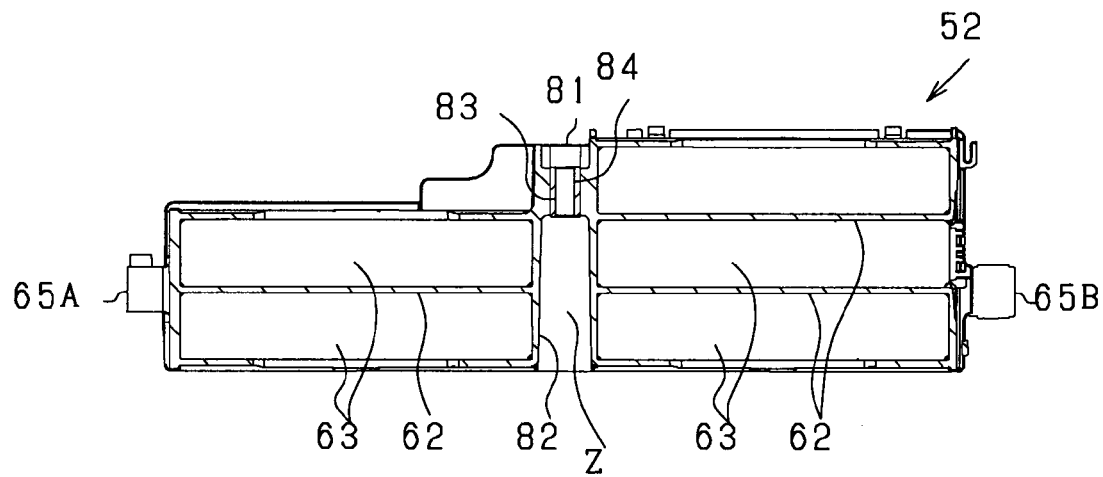
FIG. 15 is a diagram showing a vertical cross sectional view of the battery case.

Next, an intermediate structure 81 that is provided between the batteries 51 arranged in the two level stacking section (two level-stacked section of the housing portion 63) and three level stacking section (three level-stacked section of the housing portion) in the battery case 52 now be described. FIG. 14 is a diagram of a plan view of the battery case 52, and FIG. 15 is diagram showing a vertical section view of the battery case 52. It is noted that FIG. 15 is a cross section taken across a line 15-15 in FIG. 14.

As shown in FIG. 14 and FIG. 15, the intermediate structure 81 joins a two level housing portions 63 and a three level housing portions 63 and has a middle groove section 82 which separates these housing portions 63. The middle groove section 82 is opened towards a lower part thereof, which forms a space part Z that extends in a perpendicular direction to the arranging direction of the batteries. The fixing part X3 of the middle region A3 (refer to FIG. 5 and FIG. 6) that is formed to protrude upwardly from the bottom plate 31 of the base 17 is configured to occupy the space part Z, from a lower part, specifically from the bottom plate 31. That is, the module fixing member 33, a plate fixing member 34 and a board fixing member 35 are provided to enter into an inside of the middle groove section 82, from the lower part thereof.

The intermediate structure 81 has a connection portion 83 that connects to a tip-end side of a corresponding module fixing member 33. The connection portion 83 has a through-hole that passes through a vertical direction thereof. The through-hole has the cylindrical metal collar 84 as the strength supporting member incorporated therein. In this case, when the battery module 11 has been assembled to the base 17, a tip end of the module fixing member 33 and the connection portion 83 are in close contact, and in this state the fastener portions N are tightened. The battery module 11 (battery case 52) is thus fixed to the base 17.

The intermediate structure 81 has insertion holes 85 and 86 into which the plate fixing members 34, and the board fixing members 35 of the middle region A3 are respectively inserted. One of each insertion holes 85 and 86 is provided on both ends of the intermediate structure 81 with the connection portion 83 intervened therebetween.

Figure 16:
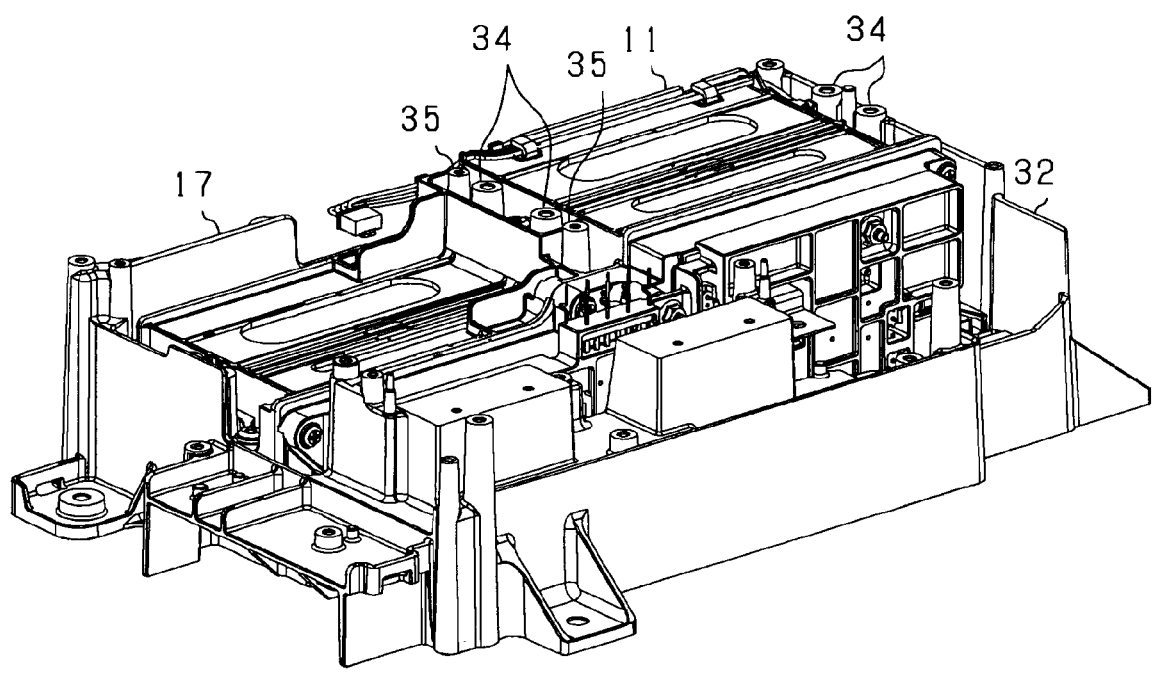
FIG. 16 is a diagram showing a perspective view of an assembled state of the battery module on the base.

The plate fixing member 34 and the board fixing member 35 are both configured as taller parts than the module fixing member 33 (refer to FIG. 6). Therefore, when the battery module 11 has been assembled to the base 17, the respective plate fixing members 34 and the board fixing members 35 are inserted into the holes 85 and 86 and provided to extend upwardly, and tip ends thereof are exposed above the battery case 52 (refer to FIG. 16). That is, the tip ends of the plate fixing member 34 and the board fixing member 35 extend to a higher position, that is above the case, in the vertical direction than the battery case 52 does. In this state, the plate 13 and the control board 12 are fixed to the plate fixing member 34 and the board fixing member 35.

In FIG. 7 other configuring elements include an exhaust duct 54. The exhaust duct 54 includes a recovery space section that recovers gas and electrolyte solution that is discharged from the battery inside when the exhaust valve 57 provided on each battery 51 is opened. The exhaust duct 54 has a voltage output pathway that outputs a terminal voltage of each battery 51 to the control board 12 for the 5 batteries 51 that are linearly connected to form a battery group.

Figure 17:
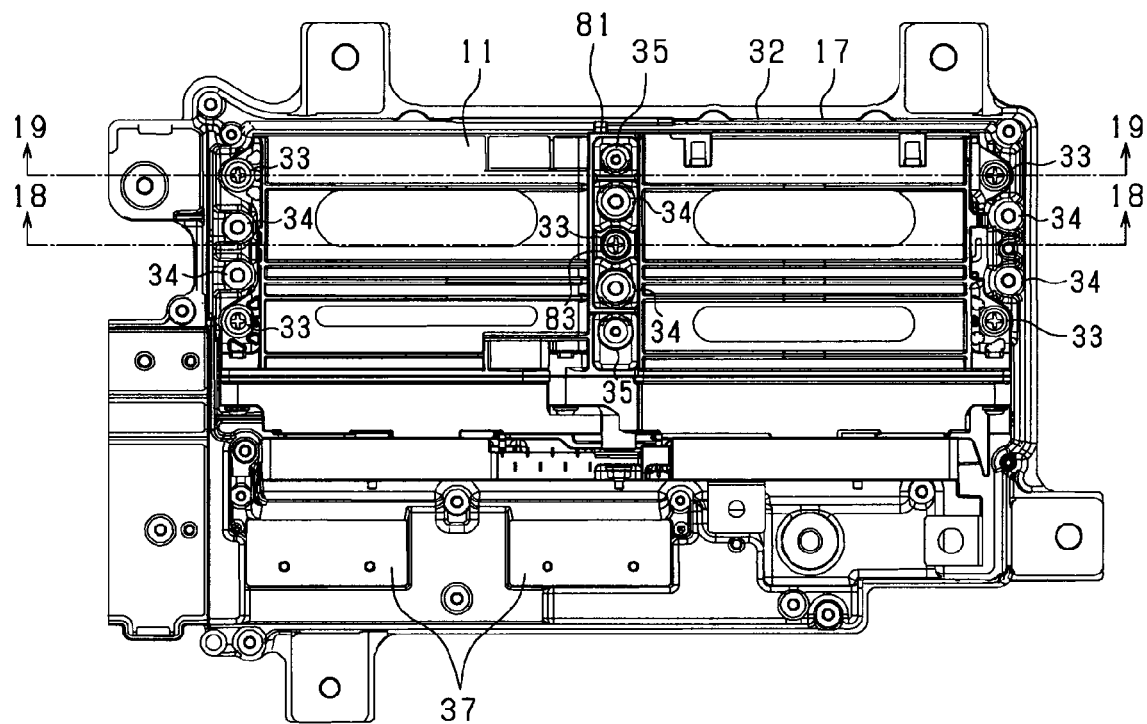
FIG. 17 is a diagram showing a plan view of an assembled state of the battery module on the base.

Next, release of battery heat from the base 17 will next be described with reference to FIGS. 17 to 19, when the battery module 11 has been assembled to the base 17, that is, in an assembled state. FIG. 17 is a diagram showing a plan view of the battery module 11 assembled to the base 17. Furthermore, FIG. 18 is a diagram of a vertical cross sectional view along a position of the connection portion 83 of the intermediate structure 81. The vertical cross sectional view shown in FIG. 18 is specifically a cross sectional view taken across a line 18-18 shown in FIG. 17. FIG. 19 shows a cross sectional view of the module fixing members 33 in the end regions A1 and A2 taken across a line 19-19 of FIG. 17.

As shown in FIG. 18 and FIG. 19, with the battery module 11 assembled to the base 17, that is the assembled state, the fixing part X1 of the end region A1 and the fixing part X2 of the end region A2 are respectively positioned on the ends and the fixing part X3 is positioned in the middle region A2 in the center position, in the length-wise direction. In this case, the fixing parts X1 to X3 are provided as intermediate heat releasing members on each end of the battery fixing module 11, in length-wise direction of the battery module 11, that is, with the batteries 51 intervened therebetween. Heat is thus released from the batteries 51 via the fixing parts X1 to X3.

The fixing part X3 of the middle region A3 will now be described. At the module fixing member 33, heat from the batteries 51 is directly transmitted via the connection portion 83 of the intermediate structure 81 (heat from the battery module 11) and heat is also transmitted from each of the batteries 51, which are adjacent to each other at the space part Z of the middle groove section 82.

At the plate fixing member 34 and the board fixing member 35, heat is transmitted each battery 51 that are adjacent to each other, in the horizontal direction, at the space part Z of the middle groove section 82. As a consequence, heat can be suitably released, even in the center position where battery heat is easily accumulated. It is noted that fixing part X3 is the intermediate heat releasing portion. The fixing parts X1 and X2 of the respective end regions A1 and A2 are side heat releasing portions.

Figure 20:
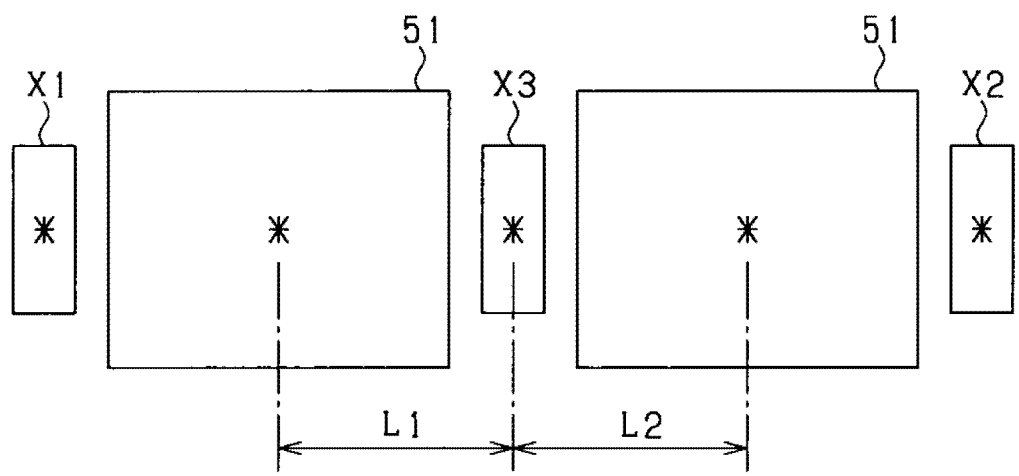
FIG. 20 is a diagram showing a plan view of an arrangement of batteries and fixing members.

A positional relation of each battery 51 and each fixing part X1 to X3 may be arranged as described below. FIG. 20 is a diagram showing a plan view of the position of the batteries 51 in the fixing parts X1 to X3. Symbols that are shown as * in FIG. 20 each represent a center position of a respective fixing part. Furthermore, an equal distance is provided from a center point of the battery 51 to the fixing part X3, which is arranged in at a center position between the fixing part X1 and the fixing part X2 (L1=L2). In the plan view thereof, center positions of the fixing parts X1 to X3 may be a position that overlaps in a side surface range of the batteries 51. However, as long as the fixing parts X1 to X3, as the heat releasing members, are positioned to oppose a side surface of the battery 51, a position thereof is not limited to the position described above.

Figure 21:
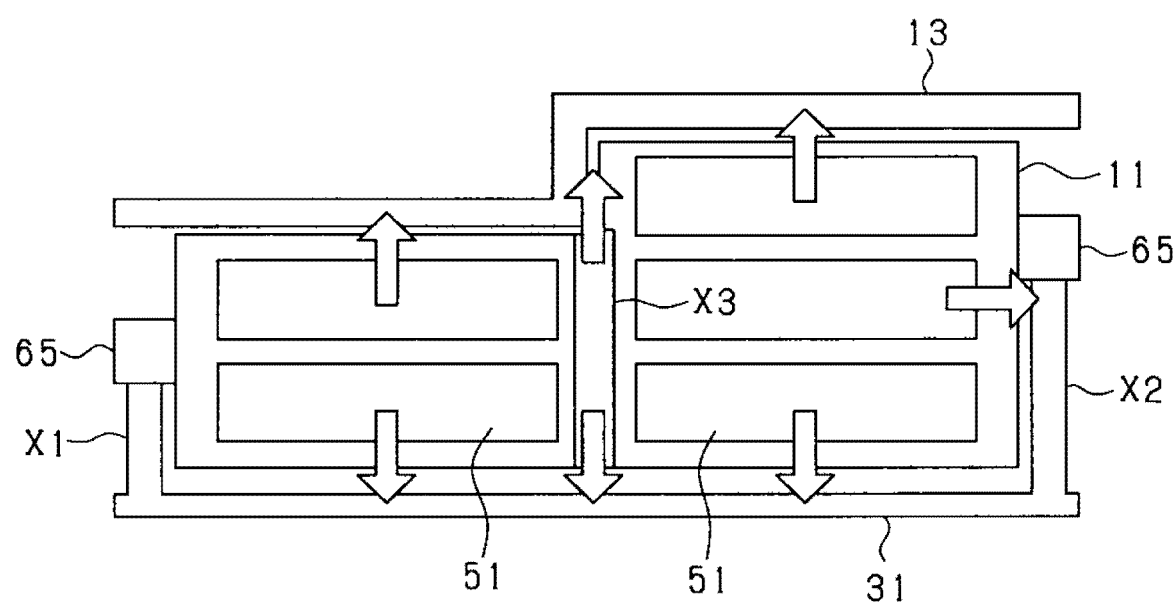
FIG. 21 is a diagram showing a heat releasing state of the battery module.

Since that the plate 13 is attached to the top surface of the battery module 11, heat is released from the battery module 11 as shown in FIG. 21. In this case, releasing of heat is performed at the surrounding wall 32, for example, via the fixing parts X1 and X2 which are provided on each side, specifically one fixing part on each side, on both ends of the battery module 11. At the center position of the battery module 11, heat is released to the bottom plate 31 and the plate 13, via the fixing part X3 provided in a center section thereof, in addition to the heat that is released from a top surface and a lower surface of the batteries 51, which are the largest surface areas of the batteries 51.

Effects of the first embodiment will now be described.

The configuration includes the protruding portion 65B, as the fastener portion that is fastened by the fastener portion N. The protruding portion 65B is positioned on the inside of the surrounding wall 32 of the case 16, and the temperature sensor 74 is arranged next to the protruding portion 65B. In a case of the surrounding wall 32 being pressed against by an external force and deformation occurring or about to occur, the deformation of the surrounding wall 32 is suppressed by the protruding portion 65B.

More specifically, deformation of the surrounding wall 32 at a front surface side of the temperature sensor 74, for example, is suppressed. As a result, the temperature sensor 74 can avoid being damaged by an external force when the temperature sensor 74 is attached to the outer surface of the case 52. According to the configuration, the temperature sensor 74 can be protected in an appropriate manner in the battery module 11.

The case 16 is configured of the base 17 and the cover 18, however, since the temperature sensor 74 is provided as one body with the battery module 11, inside the case 16, the temperature sensor 74 can be protected in an appropriate manner, regardless of the direction of an external force. That is, by enhancing a protection performance of the temperature sensor 74, a measurement precision and reliability can be secured.

Incidentally, depending on a mounting position of the battery unit 10 in a vehicle, a large external force may be applied to the battery unit 10, for example, in a case of a vehicle collision or stamping by a foot of a passenger for example. However, even in such an event, the temperature sensor 74 can be suitably protected.

It is noted that by avoiding damage that is caused by deformation of the surrounding wall 32, the temperature sensor 74 can be positioned in a close vicinity of the surrounding wall 32 and dead space in the close vicinity of the surrounding wall can be used.

As the module fixing member, the protruding portion 65B is fixed to the module fixing portion 33 that includes the fixing point positioned in upper part of the fixing portion 33, relative the bottom plate 31. In this case, since a position of the protruding portion 65B is positioned higher than the bottom plate 31 a protection space that protects the temperature sensor 74 can be suitably provided, between the surrounding wall 32 and the battery case 52. That is, since the position of the protruding portion 65B is distanced from the bottom plate 31, damaging effects to the temperature sensor 74, for example, can be suppressed, even when an external force is applied around the top end of the surrounding wall 32.

The module fixing portion 33 is provided to extend upwardly from the bottom plate 31 of the base 17, and is formed as one part with the surrounding wall 32. An enhanced strength of the fixing portions 33 is thus obtained, and a strength of the protruding portions 65B (module fastening member) which are fixed to the module fixing members 33 is also increased. According to the configuration, a reliability of the protection of the temperature sensor 74 is further enhanced.

In the configuration described, since the temperature sensor 74 is attached to the battery case at a lower position than the protruding portion 65B positioned on the upper side thereof, the temperature sensor 74 is thus positioned in the region from the protruding portion 65B to the lower board 31, when viewed in the vertical direction. As a result, the protection of the temperature sensor 74 is further achieved.

Furthermore, the configuration provides the temperature sensor 74 is mounted to side wall of the battery case 52, in the position between the plurality of the protruding portions 65B on the side portion of the battery case 52. The protection space that facilitates the protection of the temperature sensor 74 is further strengthened, between the surrounding wall 32 and the batter case 52.

The protruding portions 65B are formed in the positions that are extensions that is extended parts of the partition portions 62 on the outer surface of the case 52. As a result, if contraction, for example, of the partition portions 62 should be caused by heat from the batteries, the contraction of the partition portions is decreased by the protruding portion 65B. In this case, the protruding portions 65*b* may also be equipped with protecting function for the temperature sensor 74 and deformation suppressing function for the battery case 52.

The projecting dimension of the temperature sensor 74 to the side of the surrounding wall 32 is smaller than the projecting dimension of the protruding portion 65B. As a result, a distance from the surrounding wall 32 to the temperature sensor 74 is increased, and suitable protection of the temperature sensor 74 may be obtained.

An insulation portion or a bus bar is positioned in a section where the terminals 56 of the battery 51 is provided, and a section in which the terminals 56 are positioned is distanced from the surrounding wall 32 and provided in the center positioned of the unit. In contrast, elements are omitted in a section near to the surrounding wall 32 that has no terminals 56 provided for the battery 51, on the outer surface of the battery case 52.

In this view, the projected portions 65 (fastener portions) are configured in the sections of the battery case 52 where the terminals 56 of the battery 51 are not disposed, on the outer surface of the battery case 52, and since the temperature sensor 74 is mounted near to the protruding portions 65, the temperature sensor 74 can be protected appropriately if an outer force is applied to the surrounding wall 32.

When the batteries 51 are configured as three or more than three levels of stacked batteries, increased heat from the battery 51 which is provided on the middle level can be an issue. However, since the temperature sensor 74 is attached to a position that corresponds to the batteries 51 provided on the middle level, the temperature of the batteries 51 can be appropriately managed.

The temperature sensor 74 includes the two element portions 75, and the temperature of the same battery 51 is detected by the two element portions 75. According to the configuration, reliability detection of a temperature can be enhanced, even of an abnormality occurs at the element portions 75.

When the plurality of batteries 51 are stacked arranged next to each other, heat is liable to accumulate between batteries in the battery unit 10. In this regard, according to the configuration described above, the heat releasing performance is enhanced since the fixing part X3 is provided as the intermediate heat releasing member that is arranged in a center position of the batteries 51. As a result, heat from the batteries 51 can be appropriately released.

On the bottom plate 31 of the base 17, the fixing part X3 that consists of the fixing portions 33 to 35 is arranged to overlap with a section on which the battery module 11. In this case, heat which is received from the fixing part X3 is transmitted to the bottom plate 31 of the base 17, and heat radiation is further dissipated in the surface direction of the bottom plate. The configuration of the power system is therefore provided with an appropriate heat releasing performance.

The fixing part X3 (the intermediate heat releasing member) is configured with the intermediate structure 81 that is positioned between the plurality of housing portions 63 which are arranged in the horizontal direction of the battery case 52, and the fixing part X3 that is arranged to occupy the middle groove section 82 of the intermediate structure. In this case, whilst suppressing effects of heat between adjacent batteries, the fixing part X3 (intermediate heat releasing section) can receive heat from the batteries in a suitable manner.

The connection portion 83 is connected to the tip-end of the module fixing member 33, and the heat transmission pathway from the battery 51 at the connection portion 83 to a side of the base 17 is thus formed. In this case, since the plurality of batteries 51 are vertically arranged, the battery case 52 can be firmly fixed at the center position thereof, even when the length dimension of the battery case 52 is increased. As a result, the battery module 11 is stably maintained in the case 16.

The connection portion 83 has the function of directly transmitting heat from the side of the battery 51 to the side of the base 17, therefore a desirable heat transmission performance can be obtained. It is noted that if a screw or a bolt, for example, is used to connect the protruding portion to the connection portion 83, since heat transmission is performed by the fastening member N, the heat-releasing performance can be further enhanced via the connection portion 83.

The configuration described, the control board 12 is arranged on a side that is opposed to the bottom plate 31 with the battery module 11 intervened therebetween and the board fixing member 35 contained in the fixing part X3. As a result, function as the intermediate heat releasing portion on the board fixing member 35 can be provided in addition to the fixing member. Furthermore, heat that is generated from electrical components mounted on the control board 12 can be released to the side of the control board via the fixing part X3 (the intermediate heat releasing section).

The plate 13 is therefore disposed on the side which opposed the bottom plate 31, with the battery module 11 intervened therebetween, and the fixing part X3 includes the plate fixing members 34. In this case, an additional function of the plate fixing member 34 as the intermediate heat releasing member may also be provided.

Since the intermediate structure 81 is configured with the connection portion 83 connecting to the module fixing member 33, and the insertion hole 85 into which the respective plate fixing member 34 and the board fixing member 35 are inserted, heat can be suitably released from the battery 51.

Furthermore, since the fixing parts X1 and X2 are provided as the side heat releasing portions, in addition to the fixing part X3 as the intermediate heat releasing portion, heat from the batteries 51 is released from both the center position and both sides of the battery case 52. Since heat is released from both sides of the batteries 51, unbalanced heat distribution of the batteries can be suppressed. For example, in a case of raising a current level and thus increasing a battery size, since heat is released on both sides of the battery, a decrease in performance caused by heat can be suppressed.

The battery module 11 is fixed to the base 17 by the fixing part X3 as the intermediate heat releasing member and the fixing parts X1 and X2 as respective side heat releasing members. According to this configuration the fixing points of the battery module 11 can be compactly disposed in the horizontal direction of the batteries. As a result, fixing points that are disposed in the direction that is perpendicular to the horizontal direction of the batteries, specifically the vertical direction of the battery 51 can be omitted. As a consequence, miniaturization of the battery unit 10 can be obtained.

In the plan view of the battery module 11, the batteries 51 are arranged with the rectangular shapes surface, in the length-wise direction stacked next to each other. That is, the short side surfaces in the width-wise direction of the battery are adjacent to each other. According to the configuration, whilst securing space for the fixing part X3 which is provided as the intermediate heat discharging member in the center position, in the length-wise direction of the battery case 52, an increase in the size of the battery unit 10 due to dead space can be prevented.

The positions of the batteries 51 on the battery module 11 will now be further described. When the plurality of batteries 51 are arranged in the case 16, in a plan view, the rectangular-shaped batteries which are stacked and in the laid-down state may cause the size of the battery unit 10 to increase. However, since batteries have the short-sided surface opposed to each other in the horizontal direction, the increase in the size of the battery unit 10 is suppressed. That is, by arranging the short-sided surfaces opposed to each other, a smaller amount of dead space is created compared to an arrangement in which the batteries arranged next to each other with the long-sided surface opposed to each other. As a result, miniaturization of battery unit 10 is accomplished.

On the outside surface of the battery case 52, the protruding portions 65 are formed on the extensions of the partition portions 62. As a result, the contraction or the expansion of the partition portions 62 is decreased by introducing the protruding portion 65B, when physical contraction or physical expansion may occur due to heat from the batteries. More specifically, heat effects that are caused by battery 51 provided on the middle level of the three-level stacked batteries, which may cause the contraction (expansion and contraction) of the partition 62 can be appropriately suppressed whilst positioning the protruding portion 65B to correspond to the battery 51, since the protruding portion 65B is provided on the extensions of the partition portion 62. As a consequence, stress that is generated in the battery case 52 is decreased, and protection of the battery case 52 and the battery module 11 can be provided.

In the configuration described, a respective protruding portion 65 (fastener portion) is provided on each extension of the two partitions 62, which are provided on the side of the three-level stacked batteries. In this case, since the positions of the protruding portions 65 are dispersed, relative to each partition 62, suppression of the contraction or the expansion that is caused by a changed in temperature can be obtained for a whole battery case 52.

The protruding portions 65 are each disposed on the extensions of the partition 62, which are provided on both sides with the battery 51, with the middle level intervened therebetween. In this case, in a peripheral area of the battery 51 disposed on the middle level in which heat effects are a particular concern, an addition function of preventing the contraction or expansion can be provided.

Since the module-fixing member is extended upwardly from the bottom plate 31 and is formed as the one part with the surrounding wall 32, enhanced strength of the protruding portion 65 that is fixed to the module-fixing member can be obtained. Furthermore, a suitable configuration in which the contraction or the expansion of the partition 62 is further suppressed is obtained.

OTHER EMBODIMENTS

The preferred embodiment described above may be modified as follows.

Figure 22:
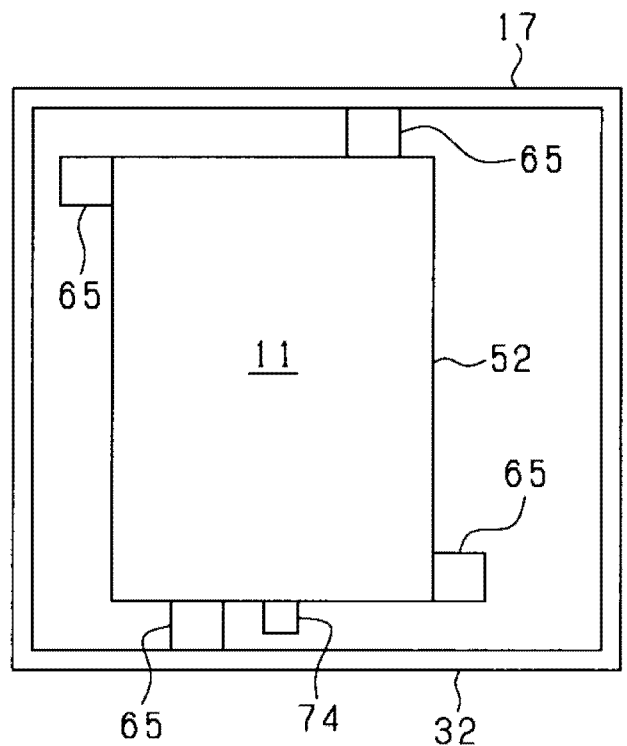
FIG. 22 is a diagram showing a schematic view of the base and the battery case according to another example.

The protruding portion 65 (module fastening member) and the temperature sensor 74 may also be arranged in the battery case 52 as shown in FIG. 22. That is, one of the protruding portions 65 is disposed on the side portion of the battery case 52, and the temperature sensor 74 is positioned next to one of the protruding portions 65 provided on one of the side portions. The position and the number of the protruding portion 65 on the side portions of the battery case 32 may also be changed.

The position of the temperature sensor 74 may be on the same side portion as the protruding portion 65 in a close vicinity thereto. For example, a configuration in which the temperature sensor 74 is positioned on a side portion of the bottom base 31 of the base 17, in relation to the protruding portion 65 may also be provided.

Figure 23:
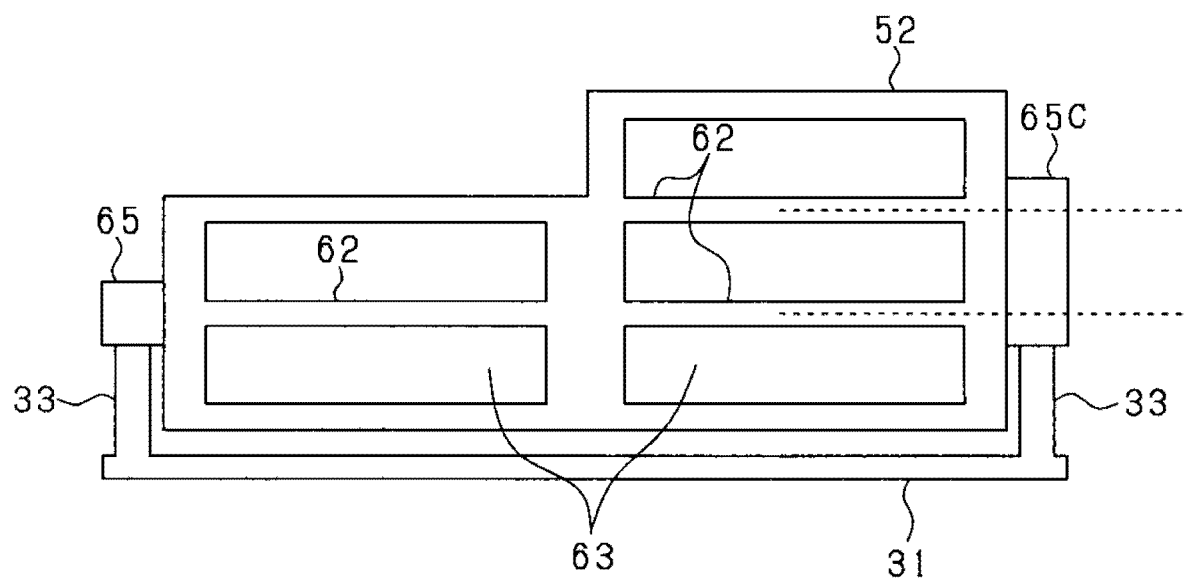
FIG. 23 is a diagram showing a schematic view of the base and the battery case according to another example.

In the battery case 52, the protruding portion 65 (module fastening member) may be provided in a range of two or more partitions 62 that are adjacent to each other in the stacking direction of the battery 51. As shown in FIG. 23, a protruding portion 65C is provided to be arranged next to two partitions, at a side of the battery 51 that is a three level stacking section. It is noted that the protruding portion 65C and the temperature sensor 74 may be disposed next to each other in the horizontal direction.

According to the configuration, additional function in which the contraction of two or more of the partitions 62 is suppressed by the protruding portion C is provided, and by increasing the size of the protruding portion 65C the suppression effect can be enhanced. Also, since the strength of the surrounding wall 32 towards an external force is increased, a configuration that provides protection of the temperature sensor 74 can be obtained.

Figure 24:
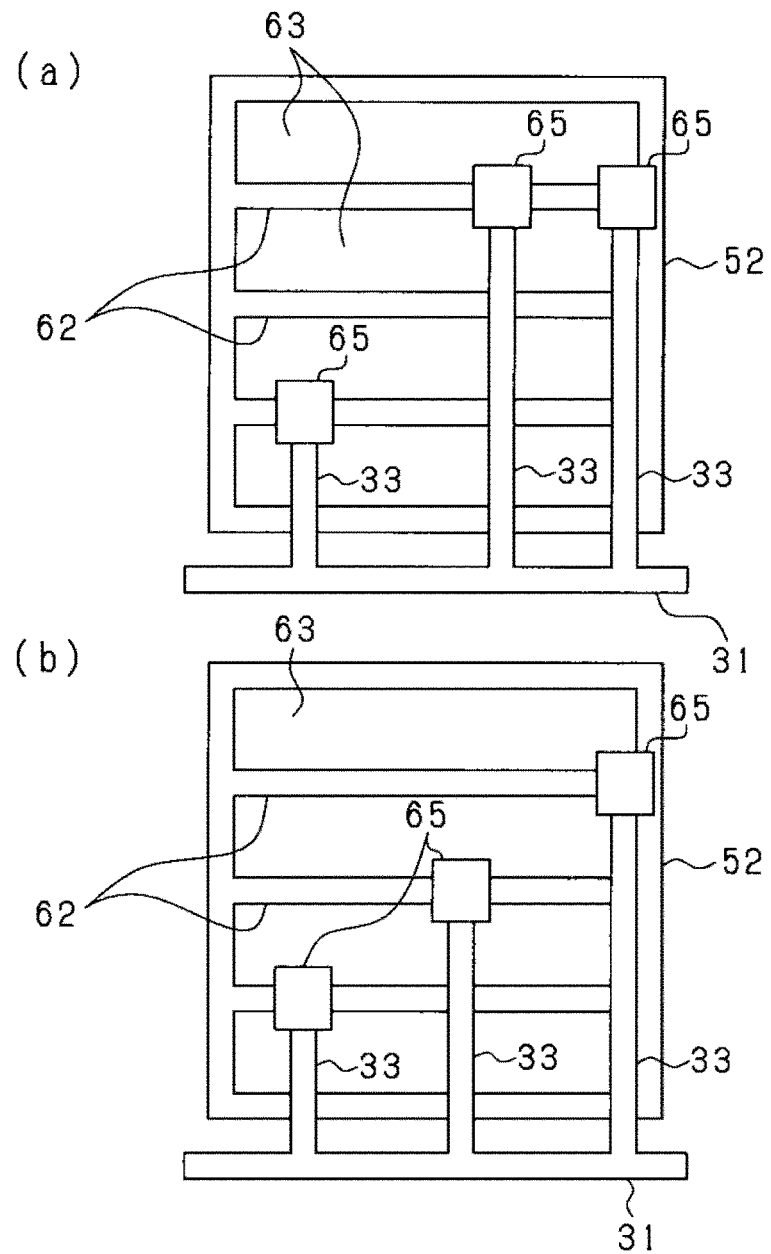
FIG. 24 is a diagram showing a schematic view of the base and the battery case according to another example.

A stacking arrangement of the battery 51 may also be configured as 4 or more levels of the battery 51. FIG. 24 shows a configuration of the battery case 52 that has 4 stacking levels of the batter 51. In FIG. 24, the housing portions 63 are provided on four levels in the vertical direction, relative to the bottom section 31 of the base 17 and the housing portions 63 are separated from each other by three partitions 63. Furthermore, (a) and (b) of FIG. 24 each exemplify the protruding portion 65 positioned at two or more partitions, which are different in each figure. It is noted that the configuration of FIG. 23 may be either combined or the partition 62 my cover a range of two or more partitions.

The flange 69 is mounted to protrude to the side part in the battery case 52. The fastener portion 70 (cover fastening member) is mounted on the flange 69 (refer to FIGS. 9 and 10). In this case, a positional relation between the fastener portion 70 and temperature sensor 74 is provided with the sensor 74 fixed to a position at the further inside of the battery case 52 from the position at the front end of the fastening member 70 (a front end side of the flange 69).

In this configuration, the fastening member 70 has high strength, which also applies for the protruding portion 65B, thus if the fastening member 70 is positioned inside the surrounding wall 32, in a case of the surrounding wall 32 being pressed against by an external force and deformation occurring or about to occur, deformation of the surrounding wall 32 is suppressed by the fastening member 70 and the deformation of the surrounding wall 32 is suppressed. As a consequence, the temperature sensor 74 is protected from damaged that is caused by external force.

That is, as was also described for the protruding portion 65, a protection effect of the temperature sensor 74 that is provided by the fastening member 70 can be anticipated. The fastening member 70 may be thus mounted next to the temperature sensor 74 on the outer surface of the battery case 52. That is, if the protruding portion 65B is not mounted in the vicinity of the temperature sensor 70 at the side end of the battery case 52, protection of the temperature sensor 70 may be obtained from the fastening member 70 that is formed on the flange 69.

Figure 25:
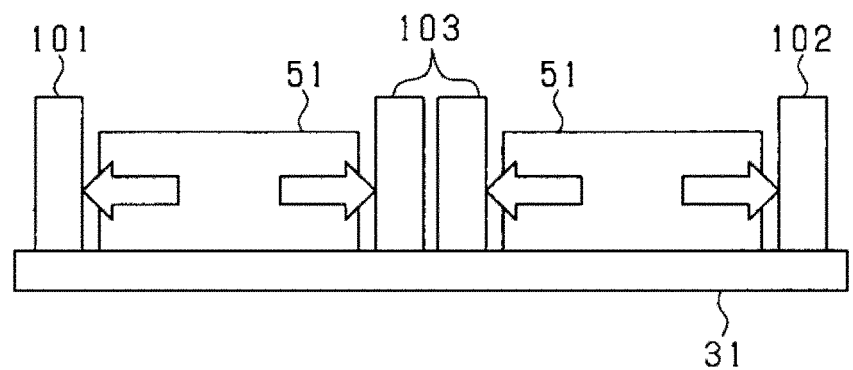
FIG. 25 is a diagram showing a schematic view of the base and the battery case according to another example.

The heat releasing member in the battery unit 10 may be modified as follows. As shown in FIG. 25, as a side heat-releasing member, heat-releasing members 101 and 102 are respectively mounted on both sides of the battery 51, in the horizontal direction thereof, and as the intermediate heat releasing member a heat releasing member 103 is mounted in a middle section of the batteries 51. In this case, the heat-releasing member 103 is configured of a plurality of parts that are individually mounted on the bottom plate 31. The heat releasing members 101 to 102 are not necessarily equipped with a fixing function to fix the battery module 11, for example.

The battery case 52 may also include the protruding portion 65 which is mounted on both ends of the partition 62 in an extending direction thereof, as a position of the protruding portion on the extension of the partition 62.

In the preferred embodiment, the battery 51 having the rectangular shape is arranged in the length-wise direction, stacked upwardly, however, the batteries 51 may also be arranged in the short-sided direction, and the battery 51 may form an equilateral square shape. The configuration that provides the plurality of batteries 51 stacked vertically, and arranged in the horizontal direction, on the bottom plate 31 of the base 17 may be replaced by a configuration where the plurality of batteries 51 are stacked along in a vertical direction thereof.

A nickel cadmium battery or a nickel hydrogen battery, for example may replace the lithium battery that is provided as the battery in the preferred embodiment, and other two dimension batteries may also be used. The battery unit 10 may also be adopted to systems other than a vehicle power system.

It is to be understood that, the present disclosure is described in accordance with the embodiments, however, not limited to the above described. That is, the present disclosure includes various modified examples and modifications within the equivalent ranges. In addition, various combinations and modes which include a combination of one element, more than one element are included within the category and the scope of the disclosure.

The invention claimed is:

1. A battery unit comprising
a battery module having a plurality of batteries; and
a case accommodating the battery module, wherein
the battery unit includes a bottom portion having a flat surface and a surrounding wall,
the battery module is disposed on the bottom portion and fixed to the bottom portion, and is provided with a first battery group and a second battery group,
each of the battery groups are disposed along the bottom portion, aligned next to each other defining an arranged direction of the battery groups, and have batteries of the plurality of batteries that are stacked in an orthogonal direction to the bottom portion,
each battery in each of the battery groups has an end surface that is disposed to face a direction that crosses with the arranged direction of the battery groups, the end surface having a positive terminal and a negative terminal, the end surface having a rectangular shape that has a pair of opposite short sides and a pair of opposite long sides that are longer than the short sides,
each of the batteries has a rectangular shaped body, the end surface being one of a plurality of outer surfaces of the rectangular shaped body, a pair of long-sided outer surfaces extending from the pair of long sides of the end surface, the long-sided outer surfaces being parallel to the bottom portion of the battery unit,
a protruding portion is arranged, between the battery groups, in a position being a center position of a section in which the battery module is positioned, extending in the orthogonal direction to the bottom portion,
the protruding portion configures an intermediate heat-releasing member that allows release of heat from the center position to the case,
the battery module includes a battery housing member that houses the plurality of batteries as one body,
the battery-housing member has a plurality of housing portions that house the plurality of batteries which are arranged along the bottom portion,
the battery module includes an intermediate structure that has a groove section separating the housing portions from each other and that is positioned between the housing portions, and
the protruding portion occupies the groove section.

2. The battery unit according to claim 1, wherein
the intermediate structure has a connection portion mounted thereon,
the connection portion is configured to fix the battery-housing member to the case by connecting a tip-end side of the protruding portion, and
a heat transmission pathway is formed from a side of the batteries to a side of the case.

3. The battery unit according to claim 1, further comprising
a board onto which electrical components, performing charging and discharging of the battery module, are mounted, wherein
the board is positioned on a side that opposes a side of the bottom portion, with the battery module intervened between the bottom portion and the board, and
the protruding portion includes a board fixing member, the board being fixed to a tip end of the board fixing member.

4. The battery unit according to claim 1, further comprising
a deformation suppression plate that is assembled to a side opposed to a side of the bottom portion, with the battery module intervened between the bottom portion and the deformation suppression plate, wherein
the protruding portion includes a plate fixing member, the deformation suppression plate being fixed to a tip end of the plate fixing member.

5. The battery unit according to claim 1, further comprising
a side heat-releasing member that is positioned on a side facing the intermediate heat-releasing member being a side section of the battery module, such that the batteries are provided between the side heat-releasing member and the intermediate heat-releasing member.

6. The battery unit according to claim 5, wherein
the intermediate heat-releasing member and the side heat-releasing member, provided in positions on both sides of the batteries in the arranged direction of the battery groups, are fixing members fixing the battery module to the case.

7. The battery unit according to claim 1, wherein
the pair of long-sided outer surfaces of the batteries have a largest surface area, among the outer surfaces of the batteries,
each of the batteries has a pair of short-sided outer surfaces extending from the pair of short sides of the end surface of the battery, and
the first battery group is arranged relative to the second battery group so that one of the short-sided outer surfaces of a battery of the first battery group opposes one of the short-sided outer surfaces of a battery of the second battery group.

8. The battery unit according to claim 2, further comprising
a board onto which electrical components, performing charging and discharging of the battery module, are mounted, wherein
the board is positioned on a side that opposes a side of the bottom portion, with the battery module intervened between the bottom portion and the board, and
the protruding portion includes a board fixing member, the board being fixed to a tip end of the board fixing member.

9. The battery unit according to claim 4, further comprising
a board onto which electrical components, performing charging and discharging of the battery module, are mounted, wherein
the board is positioned on the side that opposes the side of the bottom portion, with the battery module intervened between the bottom portion and the board, and
the protruding portion includes a board fixing member, the board being fixed to a tip end of the board fixing member.

10. The battery unit according to claim 5, further comprising
a board onto which electrical components, performing charging and discharging of the battery module, are mounted, wherein
the board is positioned on a side that opposes a side of the bottom portion, with the battery module intervened between the bottom portion and the board, and
the protruding portion includes a board fixing member, the board being fixed to a tip end of the board fixing member.

11. The battery unit according to claim 3, further comprising
a deformation suppression plate that is assembled to the side opposed to the side of the bottom portion, with the battery module intervened between the bottom portion and the deformation suppression plate, wherein
the protruding portion includes a plate fixing member, the deformation suppression plate being fixed to a tip end of the plate fixing member.

12. The battery unit according to claim 5, further comprising
a deformation suppression plate that is assembled to a side opposed to a side of the bottom portion, with the battery module intervened between the bottom portion and the deformation suppression plate, wherein
the protruding portion includes a plate fixing member, the deformation suppression plate being fixed to a tip end of the plate fixing member.

13. The battery unit according to claim 2, further comprising
a side heat-releasing member that is positioned on a side facing the intermediate heat-releasing member being a side section of the battery module, such that the batteries are provided between the side heat-releasing member and the intermediate heat-releasing member.

14. The battery unit according to claim 3, further comprising
a side heat-releasing member that is positioned on a side facing the intermediate heat-releasing member being a side section of the battery module, such that the batteries are provided between the side heat-releasing member and the intermediate heat-releasing member.

15. The battery unit according to claim 2, wherein
the pair of long-sided outer surfaces of the batteries have a largest surface area, among the outer surfaces of the batteries,
each of the batteries has a pair of short-sided outer surfaces extending from the pair of short sides of the end surface of the battery, and
the first battery group is arranged relative to the second battery group so that one of the short-sided outer surfaces of a battery of the first battery group opposes one of the short-sided outer surfaces of a battery of the second battery group.

16. The battery unit according to claim 3, wherein
the pair of long-sided outer surfaces of the batteries have a largest surface area, among the outer surfaces of the batteries,
each of the batteries has a pair of short-sided outer surfaces extending from the pair of short sides of the end surface of the battery, and
the first battery group is arranged relative to the second battery group so that one of the short-sided outer surfaces of a battery of the first battery group opposes one of the short-sided outer surfaces of a battery of the second battery group.

17. The battery unit according to claim 4, wherein
the pair of long-sided outer surfaces of the batteries have a largest surface area, among the outer surfaces of the batteries,
each of the batteries has a pair of short-sided outer surfaces extending from the pair of short sides of the end surface of the battery, and
the first battery group is arranged relative to the second battery group so that one of the short-sided outer surfaces of a battery of the first battery group opposes one of the short-sided outer surfaces of a battery of the second battery group.

\* \* \* \* \*